United States Patent
Chen et al.

(10) Patent No.: US 11,960,769 B2
(45) Date of Patent: Apr. 16, 2024

(54) HIGH PERFORMANCE SECURE READ IN SECURE MEMORY PROVIDING A CONTINUOUS OUTPUT OF ENCRYPTED INFORMATION AND SPECIFIC CONTEXT

(71) Applicant: MACRONIX INTERNATIONAL CO., LTD., Hsinchu (TW)

(72) Inventors: Chia-Jung Chen, Hsinchu (TW); Chin-Hung Chang, Tainan (TW); Ken-Hui Chen, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 51 days.

(21) Appl. No.: 17/824,226

(22) Filed: May 25, 2022

(65) Prior Publication Data

US 2023/0315340 A1  Oct. 5, 2023

Related U.S. Application Data

(60) Provisional application No. 63/309,649, filed on Feb. 14, 2022.

(51) Int. Cl.
G06F 3/06 (2006.01)

(52) U.S. Cl.
CPC .......... *G06F 3/0659* (2013.01); *G06F 3/0622* (2013.01); *G06F 3/0679* (2013.01)

(58) Field of Classification Search
CPC ..... G06F 3/0659; G06F 3/0622; G06F 3/0679
See application file for complete search history.

(56) References Cited

U.S. PATENT DOCUMENTS

| | | | |
|---|---|---|---|
| 6,957,329 B1 | 10/2005 | Aleksic et al. | |
| 7,392,399 B2 * | 6/2008 | Grohoski | H04L 63/164 |
| | | | 712/E9.067 |

(Continued)

FOREIGN PATENT DOCUMENTS

| | | |
|---|---|---|
| JP | 2001035171 A | 2/2001 |
| TW | 526496 B | 4/2003 |

(Continued)

OTHER PUBLICATIONS

Housley et al., "Using AES-CCM and AES-GCM Authenticated Encryption in the Cryptographic Message Syntax (CMS)," Internet Engineering Task Force IETF RFC5084 (//tools.ietf.org/html/rfc5084), Nov. 2007, 11 pages.

(Continued)

*Primary Examiner* — Tasnima Matin
(74) *Attorney, Agent, or Firm* — Paul A. Durdik; Haynes Beffel & Wolfeld LLP

(57) ABSTRACT

A memory device includes a command decoder that implements security logic to detect a command sequence to read a security region of a memory array with continuous encrypted data and to output/input specific contexts for the data. Output/input of specific contexts can be during a dummy cycle to achieve greater performance. A host interfacing can, for example, execute a single command to both get the encrypted data and specific contexts that were used to encrypt the data. Our technology can implement transferring data on the system bus in ciphertext and encrypted by a different Nonce or a different session key than used in a previous transfer operation. In this way, data will be represented with different ciphertext on the bus at different sessions; thereby defending against a replay attack.

20 Claims, 18 Drawing Sheets

(56) References Cited

U.S. PATENT DOCUMENTS

| | | | |
|---|---|---|---|
| 9,280,773 B1* | 3/2016 | Evans | G06Q 20/4014 |
| 11,264,063 B2 | 3/2022 | Chen et al. | |
| 2004/0228481 A1 | 11/2004 | Crispin et al. | |
| 2007/0244819 A1 | 10/2007 | Goeke et al. | |
| 2008/0320263 A1* | 12/2008 | Nemiroff | G06F 21/6209 |
| | | | 711/164 |
| 2014/0137271 A1 | 5/2014 | Hyde et al. | |
| 2020/0186339 A1* | 6/2020 | Hung | G06F 3/068 |
| 2020/0213138 A1 | 7/2020 | Mondello et al. | |
| 2020/0241768 A1 | 7/2020 | Chen et al. | |
| 2020/0372949 A1* | 11/2020 | Zhao | G11C 13/0026 |
| 2021/0057002 A1* | 2/2021 | Chen | H04L 9/3242 |
| 2021/0406411 A1 | 12/2021 | Amato et al. | |

FOREIGN PATENT DOCUMENTS

| | | |
|---|---|---|
| TW | 200504525 A | 2/2005 |
| TW | 200519738 A | 6/2005 |
| TW | 201837774 A | 10/2018 |
| TW | 202042241 A | 11/2020 |
| TW | 202109546 A | 3/2021 |

OTHER PUBLICATIONS

Krawczyk et al., "HMAC: Keyed-Hashing for Message Authentication," Internet Engineering Task Force IETF RFC 2104 (//tools.ietf.org/html/rfc2104), Feb. 1997, 11 pages.

Macronix International Co., Ltd. "Application Note SFDP Introduction: Serial Flash Discoverable Parameter Structure," Publication No. AN-114, Sep. 23, 2011, 15 pages.

NIST Special Publication 800-38A, Dworkin, "Recommendation for Block Cipher Modes of Operation: Methods and Techniques," Dec. 2001, 66 pages.

NIST Special Publication 800-38D, Dworkin, "Recommendation for Block Cipher Modes of Operation: Galois/Counter Mode (GCM) and GMAC," Nov. 2007, 39 pages.

Rescorla, "Diffie-Hellman Key Agreement Method," Internet Engineering Task Force Ietf Rfc 2631 (//tools.ietf.org/html/rfc2631), Jun. 1999, 13 pages.

Salowey, et al. "AES Galois Counter Mode (GCM) Cipher Suites for TLS," Internet Engineering Task Force IETF RFC 5288 (//tools.ietf.org/html/rfc5288), Aug. 2008, 8 pages.

* cited by examiner

HIGH PERFORMANCE SECURE READ IN SECURE MEMORY PROVIDING A CONTINUOUS OUTPUT OF ENCRYPTED INFORMATION AND SPECIFIC CONTEXT

PRIORITY APPLICATION

This application claims the benefit of U.S. Provisional Patent Application No. 63/309,649 filed 14 Feb. 2022; which application is incorporated herein by reference.

BACKGROUND

Field

The disclosed technology relates to integrated circuit memory devices, that support secure storage and retrieval, and particularly to a command decoder sequence to provide a high performance, secure read from a security region within an integrated circuit memory device.

Description of Related Art

In modern information storage technology, many different types of memory architectures have been created, such as Flash, ReRAM, EPROM, PCM and so forth; each provides storage of digital data and addresses different needs and requirements of a variety of applications.

Digital data is easy to store and transmit; ease of access, however, makes security sensitive data stored as digital data easy to intercept and steal by the unauthorized party. For example, if the digital data is stored in an external memory, an unauthorized party such as a hacker may probe on the bus to steal the data. Compounding the problem, in an application it is desirable to have both security features and read/write performance.

Thus, it is desirable to provide improved mechanisms for reading stored digital securely as well as efficiently.

SUMMARY

A memory device includes a command decoder that implements security logic to detect a command sequence to read a security region of a memory array and to output a continuous flow of read data in encrypted form along with an output/input of a specific context for the data. Some implementations can output/input specific contexts during a dummy cycle to achieve greater performance. The specific context includes one or more of a nonce, a dummy cycle monotonic counter, a fixed value, a unique ID, and any combination thereof. With our disclosed technology, an interfacing host can, for example, execute a single command to both get encrypted data and specific contexts that were used to encrypt the data. In some embodiments, our disclosed technology implements transferring data on the system bus in ciphertext and encrypted using a different Nonce or a different session key than used in a previous transfer operation. In this way, data will be represented using different ciphertext on the bus at different sessions; thereby defending against a replay attack.

In a representative secure command mechanism implementation, a memory device includes a memory array including a plurality of bit lines, an input/output interface for I/O data units, data path circuits connected between the memory array and the input/output interface, and circuitry to maintain a specific context used in conjunction with encrypting information. The memory device has a security engine (or "crypto engine") that includes circuitry to encrypt information retrieved from the memory array using the specific context and output the information as encrypted along with the specific context. A command decoder circuit implements logic to determine, responsive to commands received at the input/output interface, that command information received from a host includes a secure memory read command, and to trigger performing, substantially contemporaneously: (i) outputting, along with the specific context, a first set of information read from memory array and encrypted by the security engine; (ii) using the security engine, performing encryption upon a second set of information read from the memory array; and (iii) reading a third set of information from the memory array into a buffer to be encrypted by the security engine. By repeating these activities until a specified end of a secure area of addresses in the memory array is reached, the decoder and security engine can enable the memory device to provide a continuous output of encrypted information along with the specific context.

In implementations, the memory device's command decoder circuit also implements logic to perform detecting a command code field and a payload in a received command sequence. The decoder detects that the command code field includes an op code indicating a continuous secure memory read in which information read from the memory array is encrypted by the security engine of the memory device prior to output. The command decoder also detects that the payload includes an address pointing to at least one of a plurality of addresses indicating a security region within the memory array from which information is to be read and a configurable dummy cycle in which the specific context is to be output. The dummy cycle can be configured in different methods in various implementations, such as for example (1). Using the Serial Flash Discoverable Parameter Structure (SFDP) For a detailed description, reference may be had to "Application Note SFDP Introduction," pub. AN114, Macronix International Co., Ltd. (September 2011); (2) using a Read only information array that is configured by a fabricator of the memory chip; or (3) using a configuration array that allows a user to define. In some implementations, separate commands can be used. In some implementations, a Dummy cycle number can be configured to achieve different frequency.

Some memory devices have command decoder circuits that also implement logic to perform detecting a command code field and a payload in a received command sequence. The decoder detects that the command code field includes an op code indicating an operation to receive an input of the specific context. The command decoder also detects that the payload includes a dummy cycle containing specific context information. The specific context can be stored in the memory device for use by the security engine in encrypting information read from the memory array.

Some implementations of the memory device include circuitry to maintain specific context information such as circuitry to generate a pseudo-random number, a unique ID and/or a physical unclonable function (PUF) code.

Security engine can include circuitry to implement AES-CTR block mode encryption of data read from the memory array prior to output or Galois/Counter Mode (GCM) block mode encryption of data read from the memory array prior to output.

The input/output interface for I/O data units may be parallel or a Serial/Parallel Interface IO of at least one of 1IO, 2IO, 4IO, 8IO, 1I2O, 1I4O, and 1I8O.

In another representative implementation, our technology can provide a method for performing a high performance secure read of information from a memory array of a memory chip. The method can include detecting by the memory chip that a command received from a host includes a secure memory read command. The method can further include the memory chip triggering operations to read, encrypt, and output information in a continuous "wave" by performing, substantially contemporaneously, outputting a first set of information read from the memory array and encrypted by an on-chip security engine, along with a specific context used to encrypt the first set of information; using the security engine, performing encryption upon a second set of information read from the memory array; and reading a third set of information from the memory array into a buffer to be encrypted by the security engine. By repeating these activities until a specified end of a secure area of addresses in the memory array is reached, the method can thereby provide a continuous output of encrypted information along with the specific context.

In a further representative implementation, our technology can provide a method for performing a high performance secure read of information from a memory array of a memory chip responsive to processing a multiple command sequence. The method can include detecting by the memory chip that a command received from a host includes a secure memory read command; and triggering performing of operations including: inputting a set of information encrypted by an on-chip security engine, along with a specific context used to encrypt the set of information; using the security engine to perform encryption upon a second set of information read from the memory array; and reading a third set of information from the memory array into a buffer to be encrypted by the security engine.

In a yet further representative implementation, our technology can provide a method for performing a high performance secure read of information from a memory array of a memory chip responsive to processing a multiple command sequence. The method can include detecting by the memory chip that a first command received from a host that includes a secure memory read request command and in response, triggering performing of operations including inputting a specific context to be used to encrypt information to be read out from the memory array. The method can also include detecting by the memory chip that a second command received from the host includes a secure memory read response command and in response, triggering performing of operations to output encrypted data continuously, including: outputting a first set of information read from the memory array and encrypted by an on-chip security engine, using the specific context; using the security engine to perform encryption upon a second set of information read from the memory array; and reading a third set of information from the memory array into a buffer to be encrypted by the security engine.

Implementations can be realized in which the security chip can be security memory or any chip with security engine.

In specific implementations, our technology can provide the capability to simplify a command sequence to perform a secure continuous read and save execution time.

Other aspects and advantages of the present invention can be seen on review of the drawings, the detailed description and the claims, which follow.

DETAILED DESCRIPTION

A detailed description of embodiments of our technology is provided with reference to the FIGS. 1-12. We address the problem of defending against a replay attach by representing data using different ciphertext on the bus at different sessions. In embodiments, our technology can provide high performance, secure read operations from a semiconductor memory.

Figure 1:
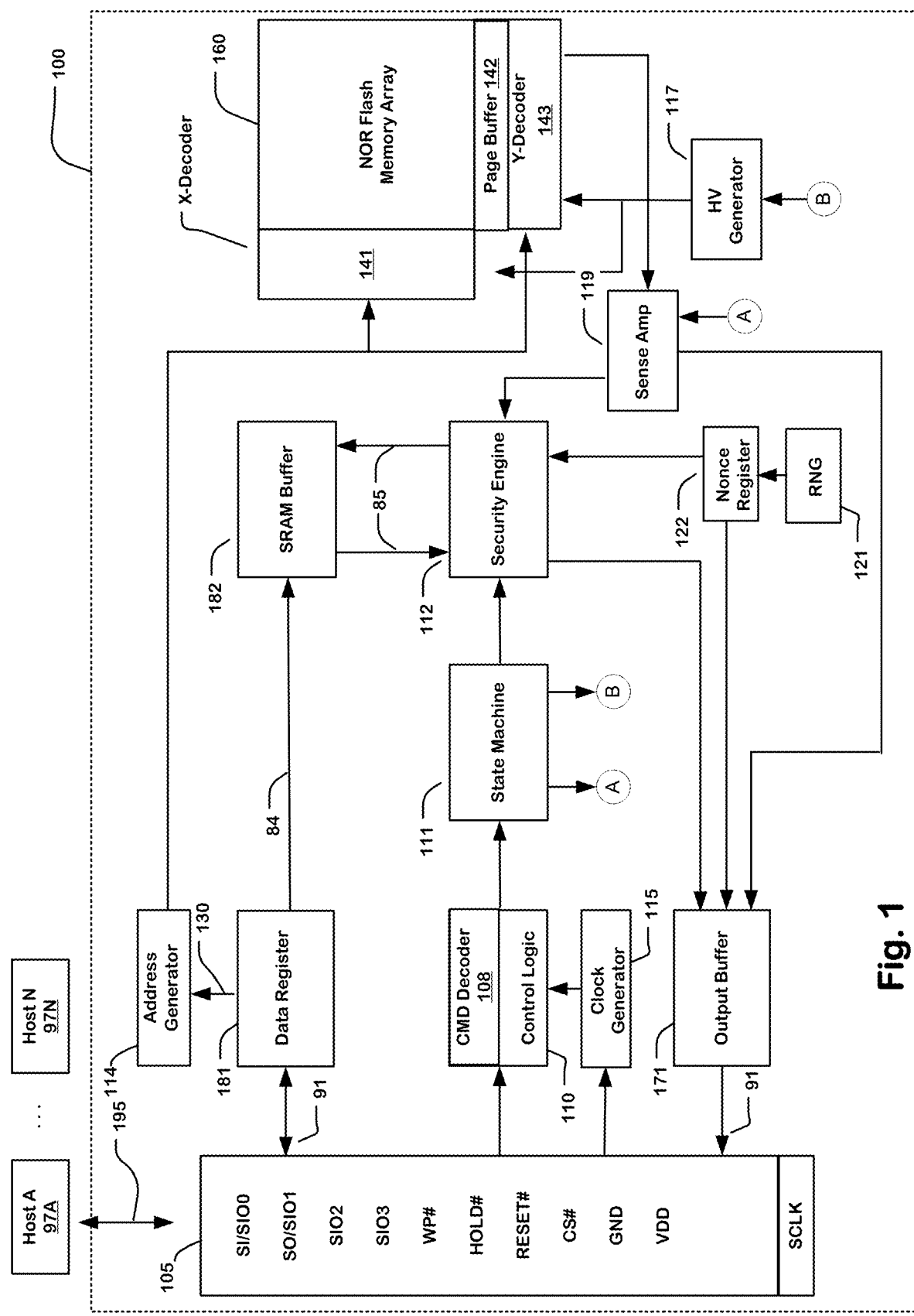
FIG. 1 is a simplified block diagram of a memory system including an integrated circuit memory device having a security command decoder mechanism according to an embodiment.

FIG. 1 is a simplified block diagram of a memory system including an integrated circuit memory device having a security command decoder mechanism according to an embodiment. An implementation of memory device 100 includes a memory array 160 that can be comprised of multiple-level cells MLC that store two or more bits of data per cell, on an integrated circuit substrate. Some implementations may use single-level cells. The memory array 160 can implement a Flash, ReRAM, EPROM, PCM memory implemented using two-dimensional or three-dimensional array technology. One implementation of memory array 160 stores data in unencrypted (plaintext) format, but memory device 100 can provide the data output in encrypted (ciphertext) form in accordance with the technology disclosed. Alternative implementations of memory array 160 store data in encrypted (ciphertext) form. Memory devices as described herein can be implemented using multichip modules, stacked chips and other configurations as well. The memory device 100 can be implemented on a single integrated circuit chip, on a multichip module that includes one or more integrated circuits in a common package, or on a plurality of chips configured to suit a particular need.

Embodying the disclosed technology, in conjunction with security engine 112, control logic 110 and security command decoder 108 constitute a controller which can be implemented using special purpose logic circuitry including state machines and supporting logic. The control logic 110 is coupled to the memory array 160 and other elements of the integrated circuit 100 as needed. The control logic 110 includes logic circuitry to control multiple-level program operations described in more detail below. In alternative embodiments, the control logic comprises a general-purpose processor, which can be implemented on the same integrated circuit, which executes a computer program to control the operations of the device. In yet other embodiments, a combination of special-purpose logic circuitry and a general-purpose processor can be utilized for implementation of the control logic.

The command decoder 108 and control logic 110 of the controller are configured to detect and execute encryption aware commands against a storage memory, such as for example, detecting and executing a command to read a security region in a memory array continuously encrypted data and output/input specific contexts. Some implementations output/input specific contexts during a dummy cycle to achieve greater performance. In embodiments described herein, the controller is responsive to the commands received at the input/output interface 105, to control memory operations including detecting and executing commands to conduct encryption or decryption operations in the storage and retrieval of information against a storage memory 160 and output results in encrypted form at the I/O interface 105.

Data is written into SRAM Buffer 182 through Data register 181 in ciphertext format. State machine 111 controls Security Engine 112 to decrypt ciphertext then store in the memory array 160. A Nonce (e.g., in nonce register 122) can be generated at power on or specific command or after every Nonce output. When control logic 110 receives a secure read command, it triggers the nonce register 122 and output buffer 171 to output a Nonce. In the meantime, the read data is read from the memory array into the security engine 112 and encrypted using the Nonce (e.g., stored in nonce register 122) and shared secret key using AES-CTR algorithm for example. After data encryption is completed, the data is sent to output buffer 171 then output to host 97*a* with ciphertext format. Security engine 112 can start to encrypt next page data while the current page output to achieve continuous data output. The disclosed technology includes executing encryption while outputting previously encrypted data in order to achieve a High-performance Secure Read operation.

Security engine 112 includes encryption/decryption circuitry that implements one or more encryption algorithms that can be realized using an IP core, programmable logic and processor, circuitry or combinations thereof. Some examples of encryption algorithms include without limitation, hash-based message authentication code (HMAC), Authenticated Encryption Standard (AES) in Galois/Counter Mode (GCM) mode (i.e., AES-GCM), Authenticated Encryption Standard with Counter in Cipher Block Chaining Message Authentication Code (CBC-MAC) mode (i.e., AES-CCM) or the like. For background information about AES-GCM and AES-CCM, reference may be had to NIST Special Publication 800-38A, entitled "Recommendation for Block Cipher Modes of Operation: Methods and Techniques" (//doi.org/10.6028/NIST.SP.800-38A), NIST Special Publication 800-38D, entitled "Recommendation for Block Cipher Modes of Operation: Galois/Counter Mode (GCM) and GMAC" (//nvlpubs.nist.gov/nistpubs/Legacy/SP/nistspecialpublication800-38d.pdf), respectively; the entirety of which are incorporated herein by reference for all purposes. Block ciphers implementing AES, such as Galois/Counter Mode (GCM), perform encryption and decryption operations on fixed length strings of bits. The length of this bit string is called a "block size" and a size of 128 bits (16 bytes) is used in implementations. Example encryption and decryption implementations of the disclosed technology, however, can support block and key sizes of 128, 192, and 256 bits.

Nonce register 122 holds a nonce and/or other context information defining a specific context used by security engine 112 to encrypt data being read out of storage array 160, and/or to decrypt data received in ciphertext form to be written into array 160. Specific context information can be output via connection to the output buffer 171. Specific context information can also be input via the interface 105 and stored in the nonce register 122.

A (pseudo-)random number generator 121 provides certain implementations with the capability to generate a nonce within memory device 100 (e.g., "on chip"). Nonce can be generated at power on or specific command or after every Nonce output.

With continuing reference to FIG. 1, memory device 100 includes the following circuit blocks coupled with one another by busses within memory device 100. Circuit blocks associated with the memory array 160 include the memory array 160, X-decoder 141, page buffer 142, Y-decoder 143, sense amplifier 119, and output buffer 171. Device 100 also includes the following control and support circuit blocks, address generator 114, data register 181, SRAM buffer 182, control logic 110, clock generator 115, state machine 111, a security engine 112, nonce register 122, and HV generator 117. Some implementations further include a (pseudo-) random number generator 121.

An implementation of device 100 include an interface 105 including several input blocks coupled to respective input/output pins. In one embodiment, the interface 105 is a serial interface implementing a set of I/O ports 195 through which commands, addresses and data are communicated. Interface 105 can be based on or compliant with a Serial Peripheral Interface (SPI) bus specification in which the command channel shares the I/O pins used by address and data. For example, the integrated circuit memory device 100 can include input/output ports using pins for receiving and transmitting SPI bus signals. One pin can be connected to an input data line carrying serial input data/address signal SI, usable for commands as well. Another pin, or multiple other pins, can be connected to an output data line or output data lines carrying serial output data signal SO. Another pin can be connected to a clock line carrying serial clock signal SCLK that is coupled to Clock Generator 115, which in turn is coupled to command decoder 108 and control logic 110. Control logic 110 is operably coupled to receive a chip select signal CS #on a CS #input terminal of interface 105. Commands or instructions may be input through input SUSIO0 block, for example, and then transferred to data register 181 and control logic 110. Control logic 110, in combination with state machine 111, interprets and executes the command such as a read, erase, or program operation. In an embodiment, control logic 110 also receives a signal from WP #/ACC block of interface 105 to perform a write protect function, and a signal from HOLD #block of interface 105 to keep a clock signal from entering the state machine 111.

Data may be input through SI/SIO0 block, SO/SIO1 block, WP #/ACC block, and HOLD #block, which are coupled to data register 181. Data register 181 is coupled by lines 84 to SRAM buffer 182 for temporary storage during decryption operations conducted by security logic in security engine 112. Security engine 112 is coupled to the SRAM buffer 182 (and thus to data register 181) by data bus 84 and data bus 85. The data buses 84 and 85 can have a bus width less than a block size, such as one byte or one word, and are used by the security engine 112 to cycle through plaintext and ciphertext stored in blocks to retrieve data from one buffer, perform encryption/decryption operations, and store results in the other buffer. The security engine 112 can also, or alternatively, be coupled by data bus 91 to the interface 105 for movement of data back and forth as necessary.

Data may be output through SI/SIO0 block, SO/SIO1 block, WP #/ACC block, and HOLD #block, which are coupled the output buffer 171. Context information defining a specific context such as for example a nonce (stored in nonce register 122) used by security engine 112 to encrypt data being read out of storage array 160 can be output via connection to the output buffer 171.

An address corresponding to a location in memory array 160 may be supplied from data register 181 to address generator 114. The address is then decoded by X-decoder 141 and Y-decoder 143. In some implementations, a page buffer 142 can be coupled to memory array 160 to provide temporary storage for memory operations. In a read operation, the data is transferred from memory array 160 through sense amplifier 119 to the output buffer 171. For write operation, data is transferred from data register 181, buffered in SRAM buffer 182 for decryption, and then written into memory array 160. For high voltage operation, e.g., for a write operation, high voltage generator 117 is activated. Other types of interfaces, including parallel interfaces can be used as well. The I/O ports 195 on a particular integrated circuit memory device 100 can be configured to provide output data with an I/O data width, which can be, for some examples, 1, 4, 8, 16, 32 or more bits in parallel per interface clock (e.g., SCLK) cycle. The I/O interface 105 can include a FIFO buffer, a shift register buffer or other supporting circuits along with a transmitter for transmitting data received at the interface on ports at a port clock rate, such as an SCLK rate for an SPI interface.

Input/output data and control signals are moved among the interface 105, the command decoder 108 and the control logic 110, and input/output ports 195 on the memory device 100 or other data sources internal or external to the memory device 100. In some embodiments, the ports 195 can connect to on-chip host circuits, such as a general-purpose processor or special purpose application circuitry, or a combination of modules providing system-on-a-chip functionality supported by the memory array 160.

In the example shown in FIG. 1, control logic 110 using a bias arrangement state machine, or machines, controls, or control, the application of supply voltages generated or provided through the voltage supply, such as read, verify and program voltages for a set of selectable program and read operations used in the device 100 operating methods described herein.

One or more parameter registers (not shown) can be included on the memory device 100 and coupled to control logic 110. The parameter registers can store parameters for a plurality of selectable program operations and a plurality of selectable read operations, which are selectable according to the processes described herein. For example, the parameter registers can store program verify voltage levels and read voltage levels used in different program and read operations. Also, the parameter registers can store details of program sequences, such as pulse height, pulse width, and pulse magnitude increments, used in programming algorithms such as incremental stepped pulse programming ISPP algorithms.

The memory array 160 can comprise floating gate memory cells or dielectric charge trapping memory cells configured to store multiple bits per cell, by the establishment of multiple program levels that correspond to amounts of charge stored, which in turn establish memory cell threshold voltages VT. The description herein is based on the use of charge trapping memory cells, such as floating gate flash memory and dielectric charge trapping flash memory. The technology can be used with other memory cell technologies. In other examples, the memory cells may comprise programmable resistance memory cells, configured for multiple bits per cell, by the establishment of multiple program levels that correspond to amounts of resistance.

In implementations, the host 97A can comprise a general-purpose processor, a special purpose processor, a processor configured as a memory controller, or other processor that uses the memory device 100. All or part of the host 97A can be implemented on the same integrated circuit as the memory. Although the above has been shown using a selected group of components for the integrated circuit device, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

Figure 2:
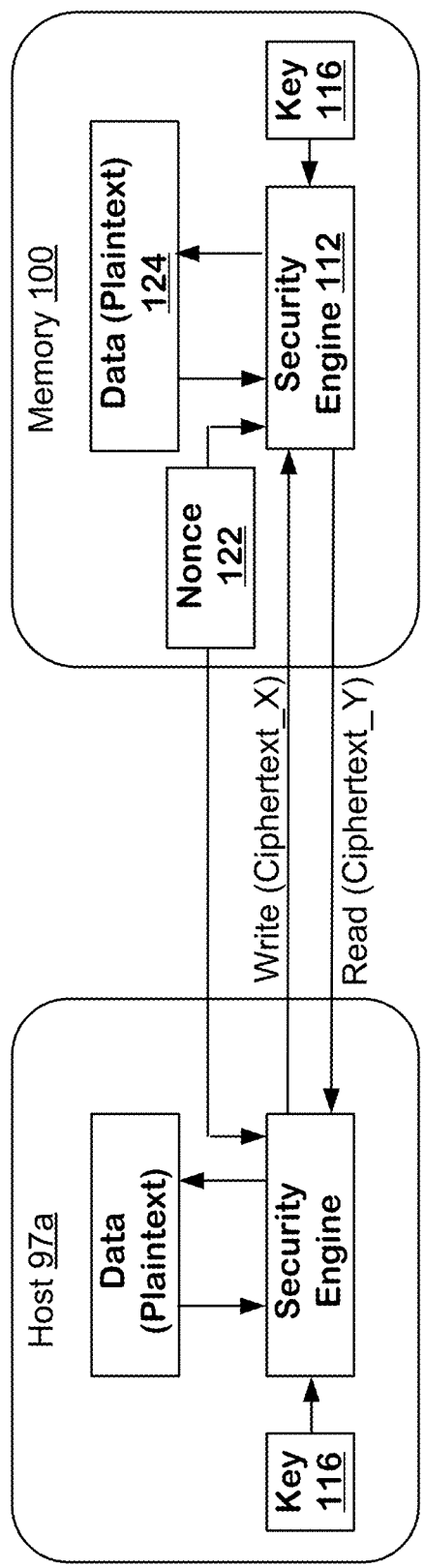
FIG. 2 is a dataflow diagram illustrating example operation of an embodiment of an integrated circuit memory device having a security command decoder mechanism like that of FIG. 1.

Having described an example security architecture for a storage memory, next examples of write and read operations conducted using security mechanisms like that of FIG. 1 will be described with reference to dataflow diagram of FIG. 2, timing diagrams of FIG. 3 and FIGS. 4A and 4B, system and timing diagrams of FIGS. 5A, 5B, and 5C and FIG. 6, and data flow diagrams of FIGS. 7, 9 and 11 and flowcharts of FIGS. 8A, 8B, 10 and 12 respectively. These diagrams are merely examples, which should not unduly limit the scope of the claims herein. One of ordinary skill in the art would recognize other variations, modifications, and alternatives. System FIG. 2 is a dataflow diagram illustrating example operation of an embodiment of an integrated circuit memory device having a security command decoder mechanism like that of FIG. 1. This diagram is merely an example, which should not unduly limit the scope of the claims herein. One of ordinary skill in the art would recognize other variations, modifications, and alternatives. In FIG. 2, host 97a is cooperatively coupled with memory device 100 by a bus. In host 97a, a security engine accesses data that is in plaintext form. Host security engine also has input of key 116. Host security engine is further enabled to receive as input a specific context, e.g., nonce from memory 100. Memory device 100 includes a security engine 112 that is cooperatively coupled to nonce register 122, to data 124 in plaintext form, and to key 116. Data 124 can be stored in memory array 160 of FIG. 1, for example. Noteworthy in FIG. 2 is that security engine 112 can achieve write and read of same data with different ciphertext on the bus.

Figure 3:
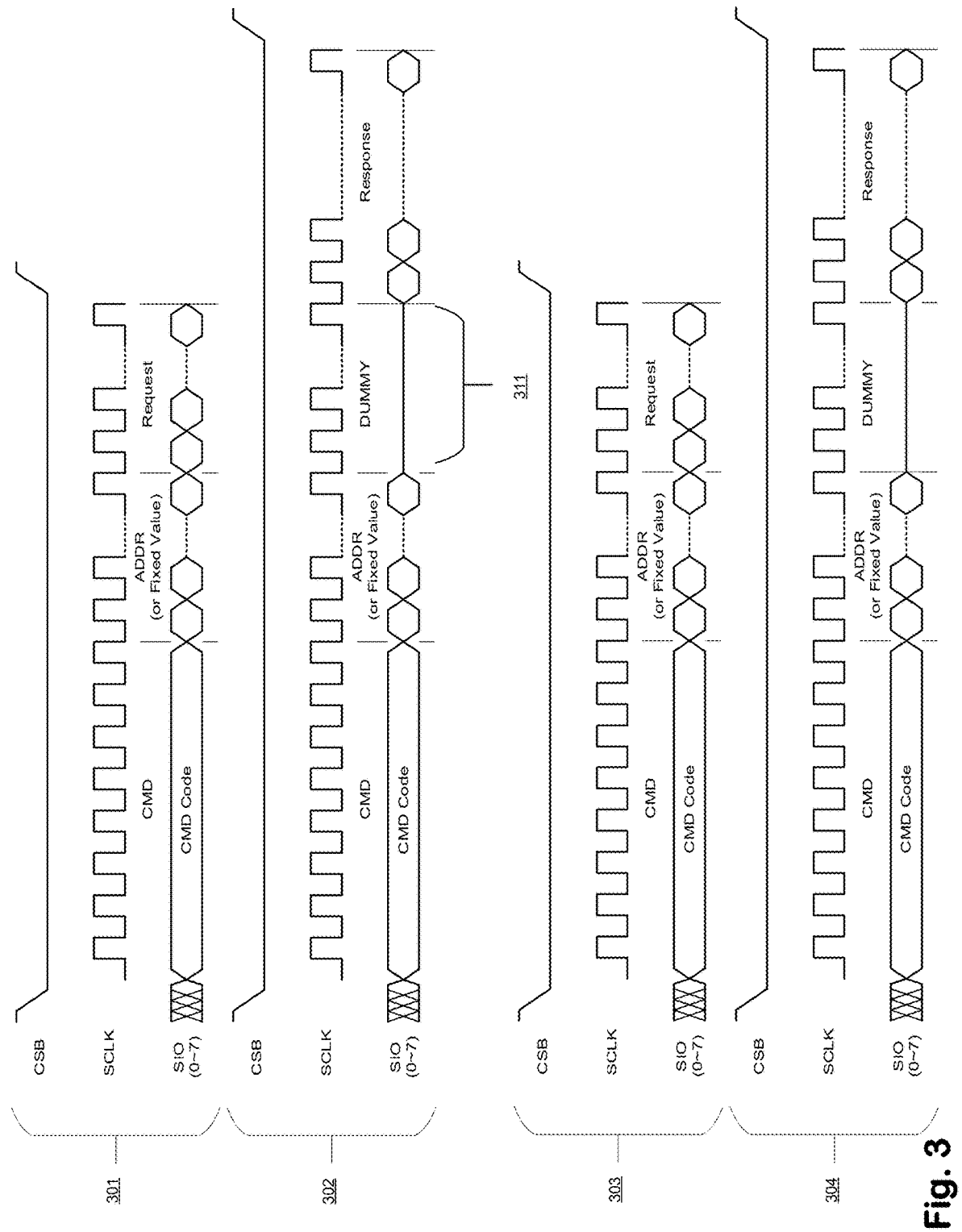
FIG. 3 is a timing diagram illustrating an example using four command interactions between a host and an integrated circuit memory device having a security command decoder mechanism.

FIG. 3 is a timing diagram illustrating an example using four command interactions between a host and an integrated circuit memory device having a security command decoder mechanism. This diagram is merely an example, which should not unduly limit the scope of the claims herein. One of ordinary skill in the art would recognize other variations, modifications, and alternatives. In FIG. 3, in activity 301, the host sends a Request "Nonce" command. In activity 302, the host sends a Read "Nonce" response command to read the Nonce from the memory device. In activity 303, the host sends a Request "Secure Read" command to read a page of data from memory array to the memory device. In activity 304, the host sends a Read "Secure Read" response command to read the data provided by the memory device.

Figure 4A:
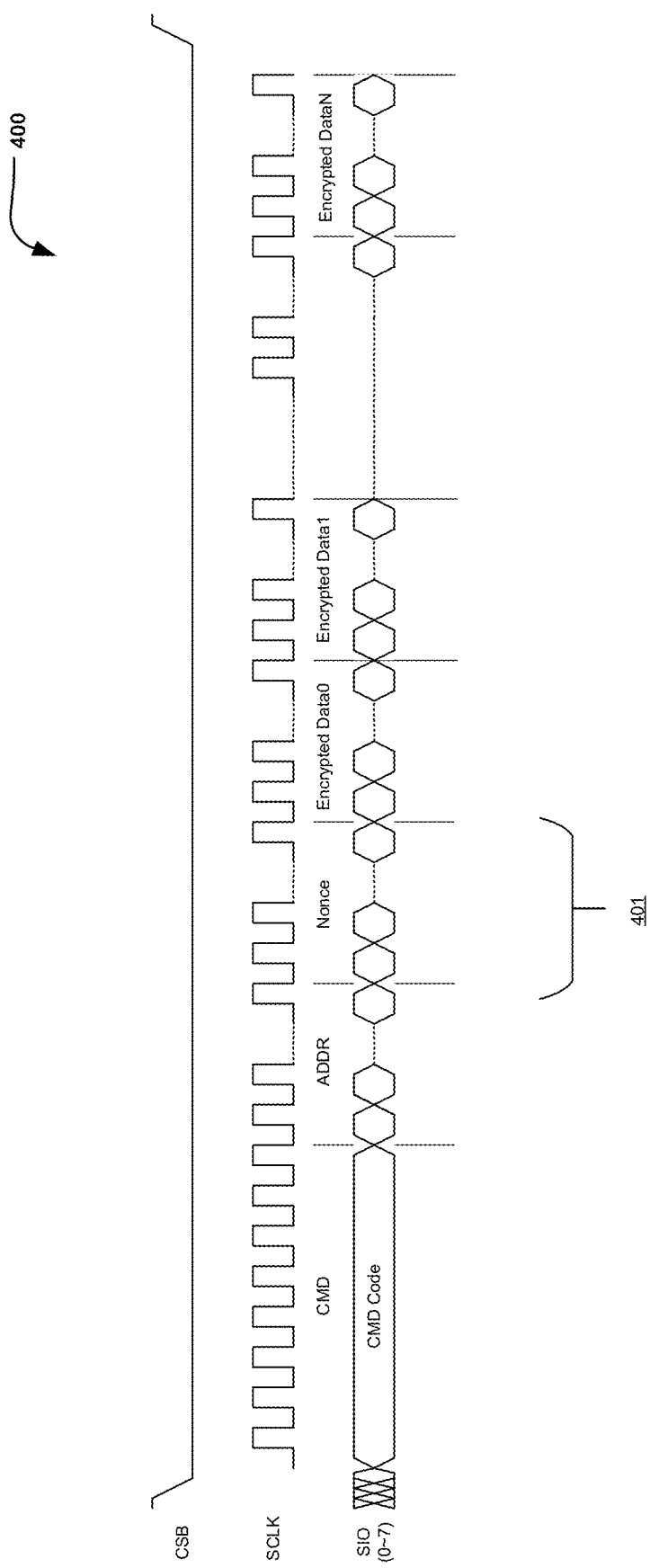
FIG. 4A is a timing diagram illustrating an example using a command interaction to exchange nonce information between a host and an integrated circuit memory device having a security command decoder mechanism.

FIG. 4A is a timing diagram illustrating an example of using a command interaction to exchange nonce information between a host and an integrated circuit memory device having a security command decoder mechanism. This diagram is merely an example, which should not unduly limit the scope of the claims herein. One of ordinary skill in the art would recognize other variations, modifications, and alternatives. The command protocol compliant with traditional SPI flash read command. In FIG. 4A, in activity 400, a Nonce can be output at the dummy cycle 401 or part of dummy cycle instead of obtaining it using additional command(s). (Compare dummy cycle 311 of FIG. 3, in which no data is transferred.) In embodiments implementing a command to request nonce and data, the data will be outputted continuously by the memory device 100 in encrypted format.

Figure 4B:
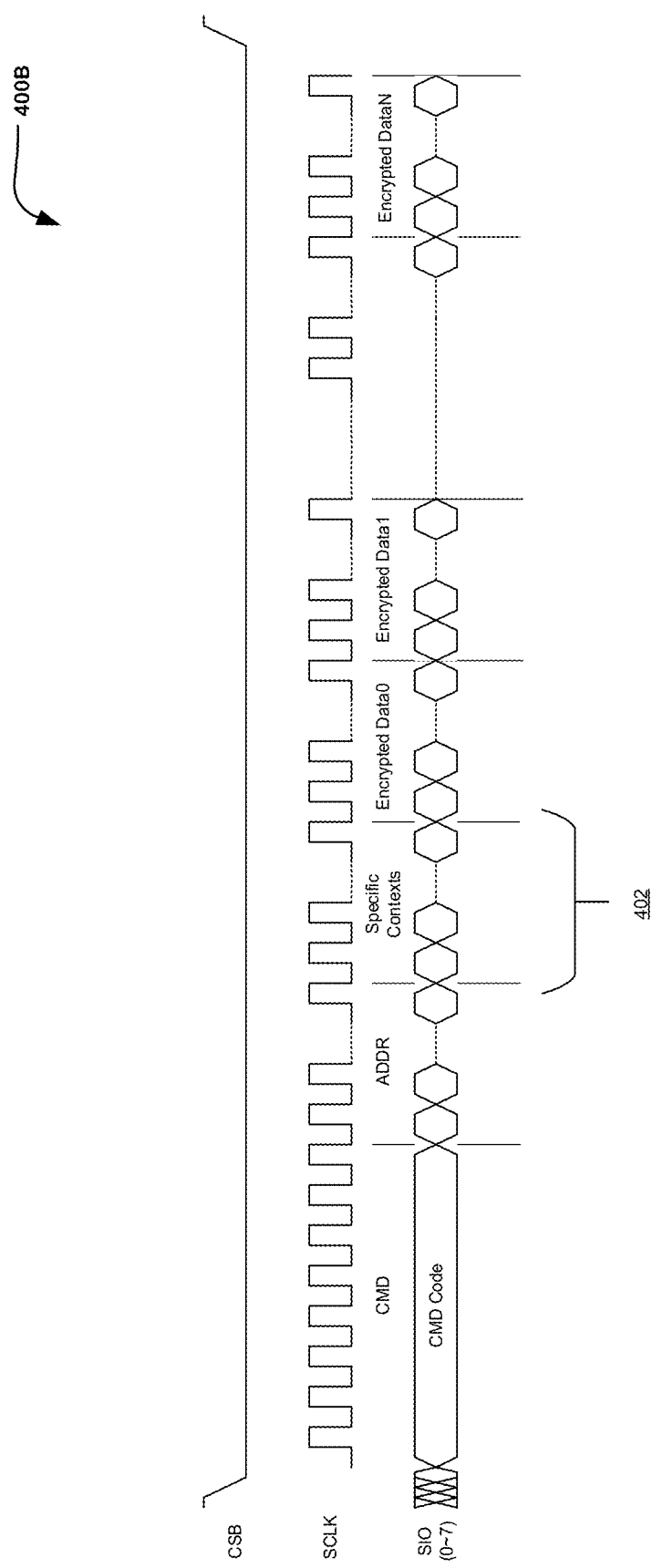
FIG. 4B is a timing diagram illustrating an example using a command interaction to exchange specific context information between a host and an integrated circuit memory device having a security command decoder mechanism.

FIG. 4B is a timing diagram illustrating an example using a command interaction to exchange specific context information between a host and an integrated circuit memory device having a security command decoder mechanism. Specific contexts can be output on the dummy cycle 402 or part of dummy cycle. Specific contexts can be nonce, monotonic counter, fixed value, unique ID or combination thereof. For example, a monotonic counter can be used for preventing replay attack since every communication session with different number.

Figure 4C:
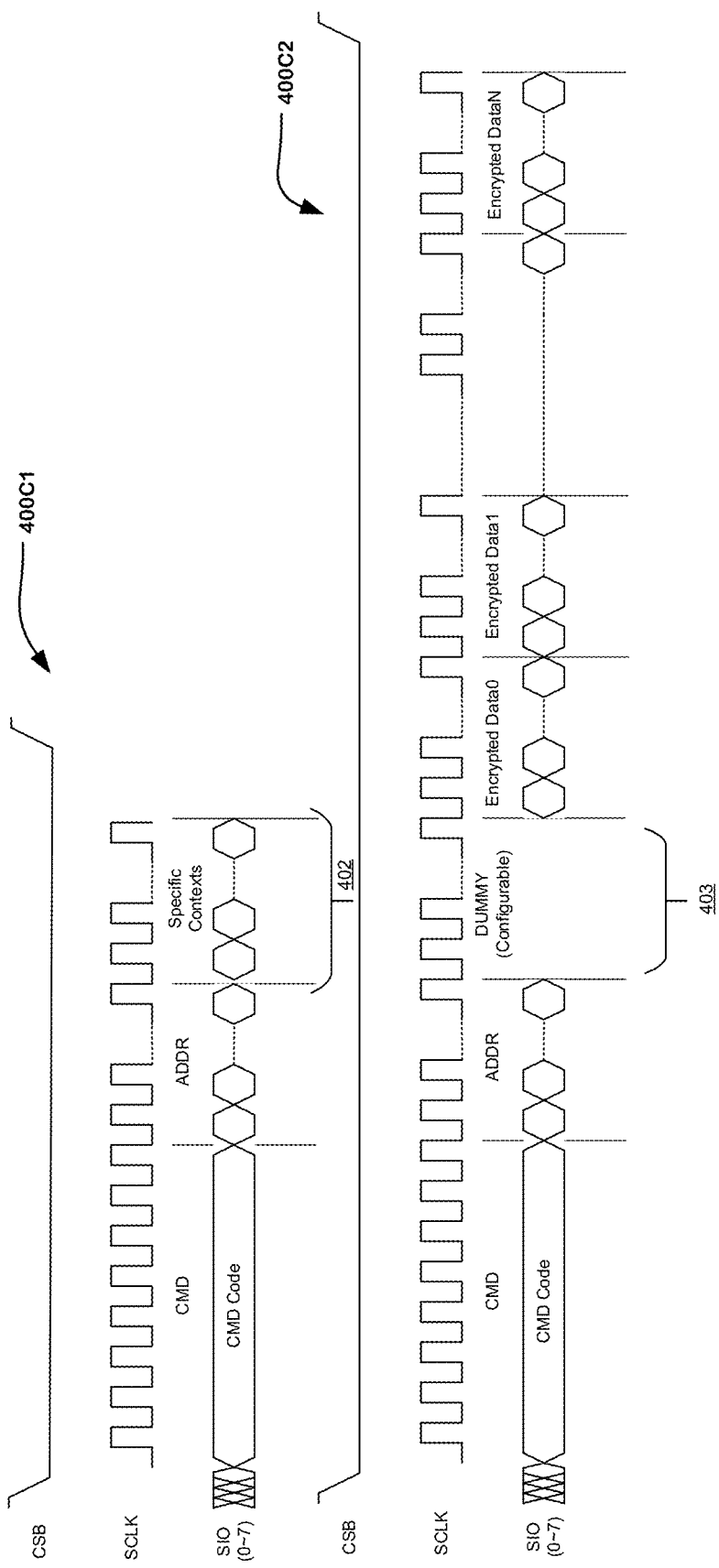
FIG. 4C is a timing diagram illustrating an example using a multiple command configuration to input specific context information from a host into an integrated circuit memory device having a security command decoder mechanism.

FIG. 4C is a timing diagram illustrating an example using a multiple command configuration to input specific context information from a host into an integrated circuit memory device having a security command decoder mechanism. In FIG. 4C a first command interaction 400C1 implements a "secure read" request command to input specific contexts 402 from the host and a second command interaction 400C2 implements a "secure read" response so that encrypted data can be output continuously between a host and an integrated circuit memory device having a security command decoder mechanism. Some implementations can achieve high throughput by virtue of the second command triggering output of encrypted data continuously in conjunction with the first command. Specific contexts 402 can be plaintext information or encrypted information. Specific contexts 402 can include a MAC to authenticate the host. Further, specific contexts 402 can be ciphertext in certain implementations to protect the host's request. The second command interaction 400C2 can include a dummy section 403 that is configurable by user or factory.

Figure 4D:
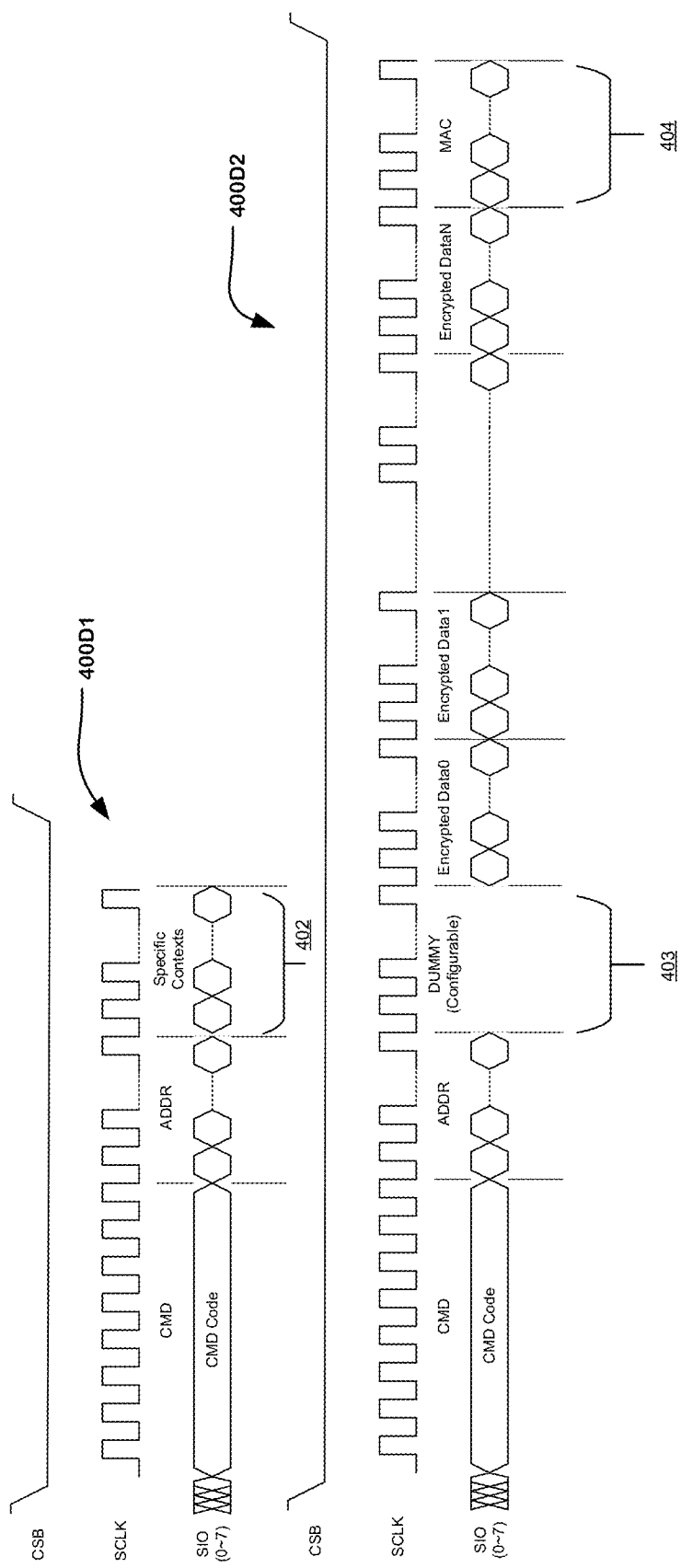
FIG. 4D is a timing diagram illustrating an example using a multiple command configuration and returning a MAC to exchange specific context information between a host and an integrated circuit memory device having a security command decoder mechanism.

FIG. 4D is a timing diagram illustrating an example using a multiple command configuration and returning a MAC to exchange specific context information between a host and an integrated circuit memory device having a security command decoder mechanism. In FIG. 4D, a first command interaction 400D1 implements a "secure read" request command to input specific contexts from the host and a second command interaction 400D2 implements a "secure read" response so that encrypted data can be output continuously along with a MAC to exchange specific context information between a host and an integrated circuit memory device having a security command decoder mechanism. The second command interaction 400D2 can also include a MAC section 404 for data integrity. The second command interaction 400D2 can also include a dummy section 403 that is configurable by user or factory.

Figure 5A:
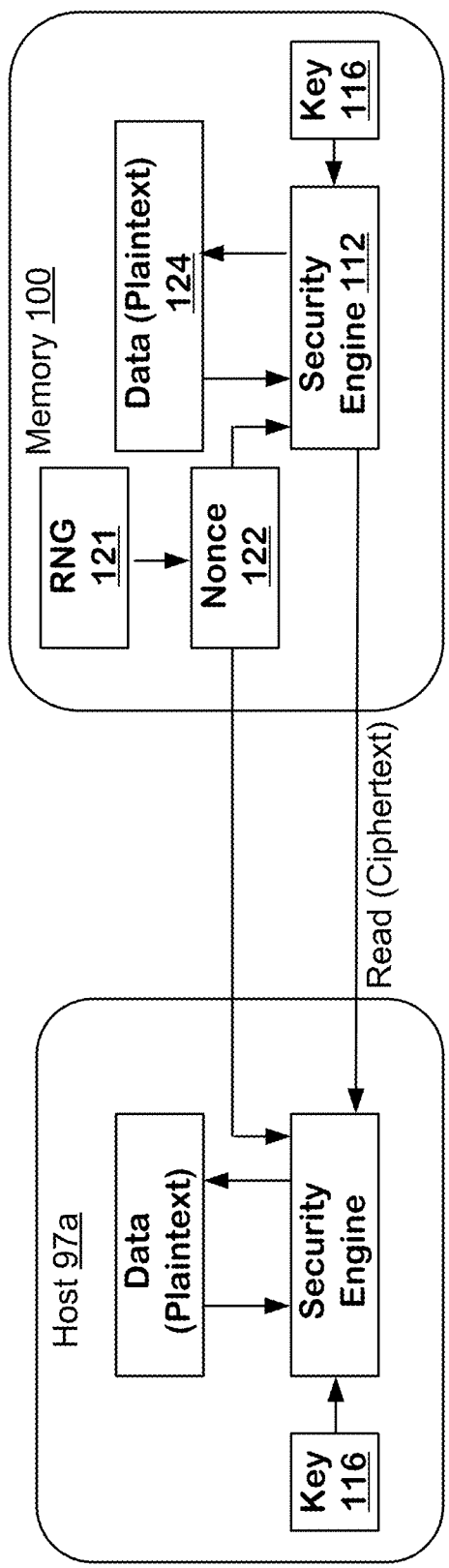
FIG. 5A is a system diagram illustrating example of exchanging nonce information between a host and an integrated circuit memory device having a security command decoder mechanism like that of FIG. 1.
Figure 5B:
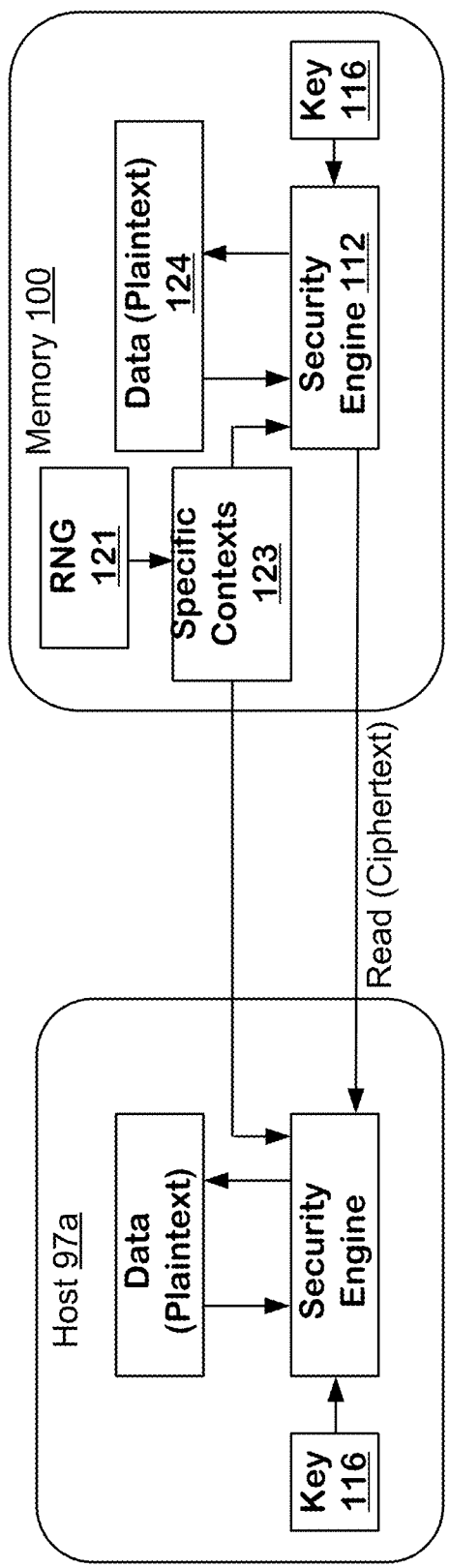
FIG. 5B is a system diagram illustrating example of exchanging specific contexts between a host and an integrated circuit memory device having a security command decoder mechanism like that of FIG. 1.

FIGS. 5A and 5B are system diagrams illustrating example operation of an embodiment of an integrated circuit memory device having a security command decoder mechanism like that of FIG. 1. This diagram is merely an example, which should not unduly limit the scope of the claims herein. One of ordinary skill in the art would recognize other variations, modifications, and alternatives. In FIG. 5A, a memory device 100 includes a security engine 112 that is cooperatively coupled to nonce generator implemented as a (pseudo-) random number generator (RNG) 121. The nonce can be generated at each power cycle or updates by a specific command sequence or change whenever a Nonce is output. The data 124 read from the memory chip can be encrypted with the security engine 112 and output to host 97a in ciphertext format. The host 97a receives encrypted data, which it then decrypts (with its own security engine) using a shared secret Key 116 and the Nonce that output from nonce register 122 of the memory chip 100. Data 124 can be stored in memory array 160 of FIG. 1, for example.

FIG. 5B is a system diagram illustrating example of exchanging specific contexts between a host and an integrated circuit memory device having a security command decoder mechanism like that of FIG. 1. In FIG. 5B, memory chip 100 includes a security engine 112 and a monotonic counter 123. The data read from the memory chip 100 will be encrypted with the security engine 112 and output to Host 97a using ciphertext format. The Host 97a receives encrypted data from the memory device 100, then decrypts it using the shared secret (Key) 116 and other contexts that output/partial output from memory chip 100. Specific contexts can be nonce, monotonic counter, fixed value, unique ID or combinations thereof.

Figure 5C:
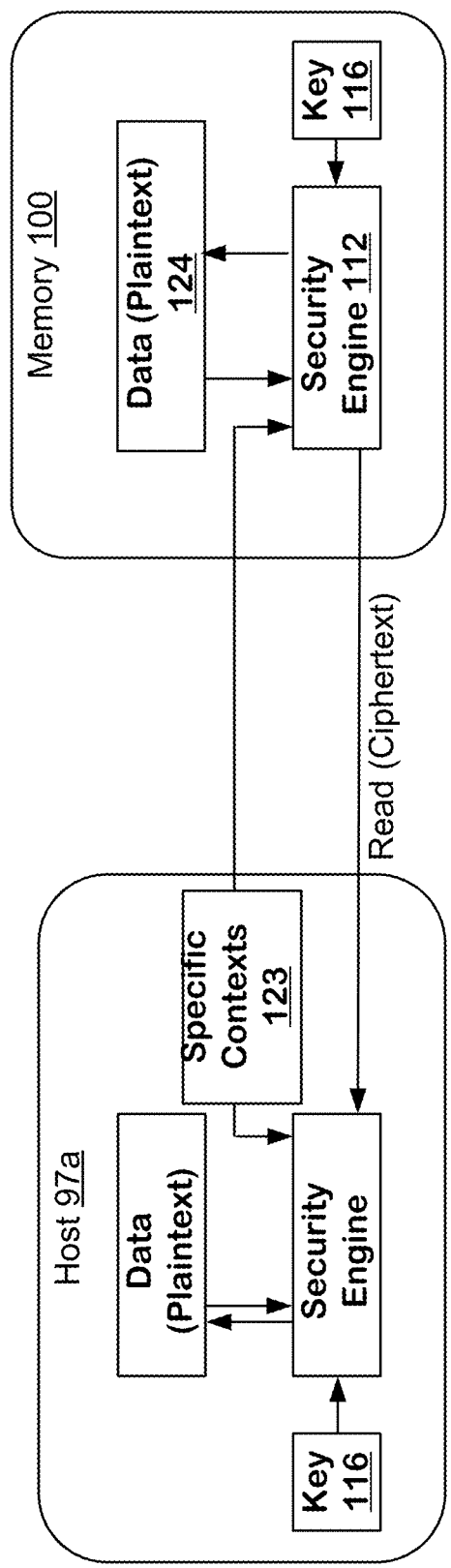
FIG. 5C is a system diagram illustrating example of exchanging specific contexts created by a host with an integrated circuit memory device having a security command decoder mechanism like that of FIG. 1.

FIG. 5C is a system diagram illustrating example of exchanging specific contexts created by a host with an integrated circuit memory device having a security command decoder mechanism like that of FIG. 1. In FIG. 5C, the host 97a receives encrypted data, then decrypts the data using the share secret (Key) 116 and input/partial input specific contexts into Memory chip 100. The context can be input from the host and also input to the security engine to encrypt/decrypt the data.

High Performance Secure Read Command

Figure 6:
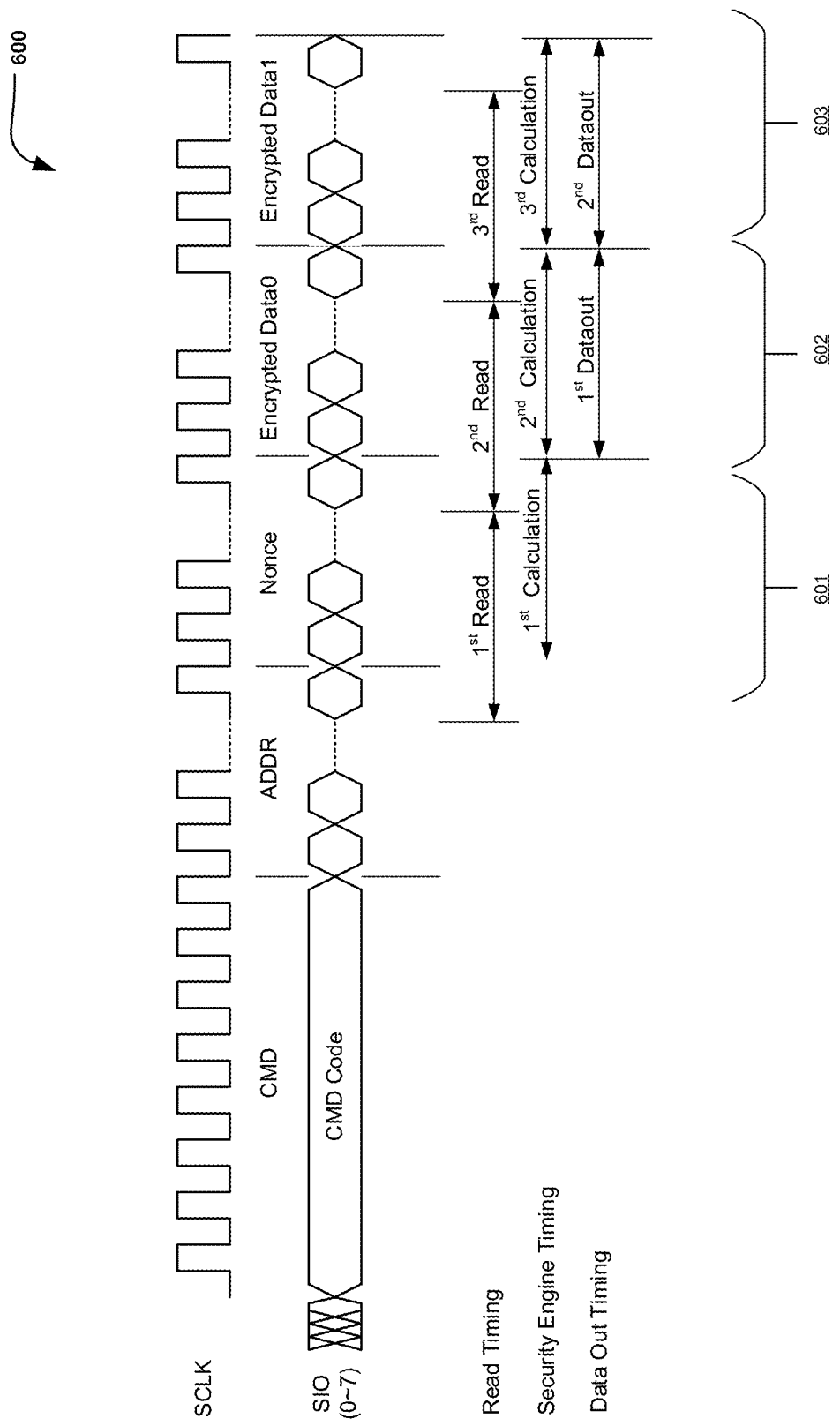
FIG. 6 is a timing diagram illustrating an example of continuous encryption process for a high performance secure read command interaction between a host and an integrated circuit memory device having a security command decoder mechanism.

FIG. 6 is a timing diagram illustrating an example of continuous encryption process for a high performance secure read command interaction between a host and an integrated circuit memory device having a security command decoder mechanism. This diagram is merely an example, which should not unduly limit the scope of the claims herein. One of ordinary skill in the art would recognize other variations, modifications, and alternatives.

In activity 601, when control logic 110 receives a secure read command, it triggers the nonce register 122 and output buffer 171 to output a Nonce. In the meantime, the read data is read from the memory array into the security engine 112 and encrypted using the Nonce (e.g., stored in nonce register 122) and shared secret key using AES-CTR algorithm for example. After data encryption is completed, the data is sent to output buffer 171 then output to host 97a with ciphertext format. In activity 602, security engine 112 can start to encrypt next page data while the current page output to achieve continuous data output. In activity 602, the security engine has encrypted the second page and begins to encrypt a third page being read from memory array 160. The second page is output. The disclosed technology includes executing encryption while outputting previously encrypted data in order to achieve a High-performance Secure Read operation.

Having described an example of a read operation conducted using security mechanisms like that of FIG. 1, next an example authenticated encryption service that implements Galois/Counter Mode encryption used in some encryption/decryption security engine 112 embodiments will be described with reference to data flow diagram 700 of FIG. 7 and flowchart 800A of FIG. 8A.

AES-CTR

Figure 7:
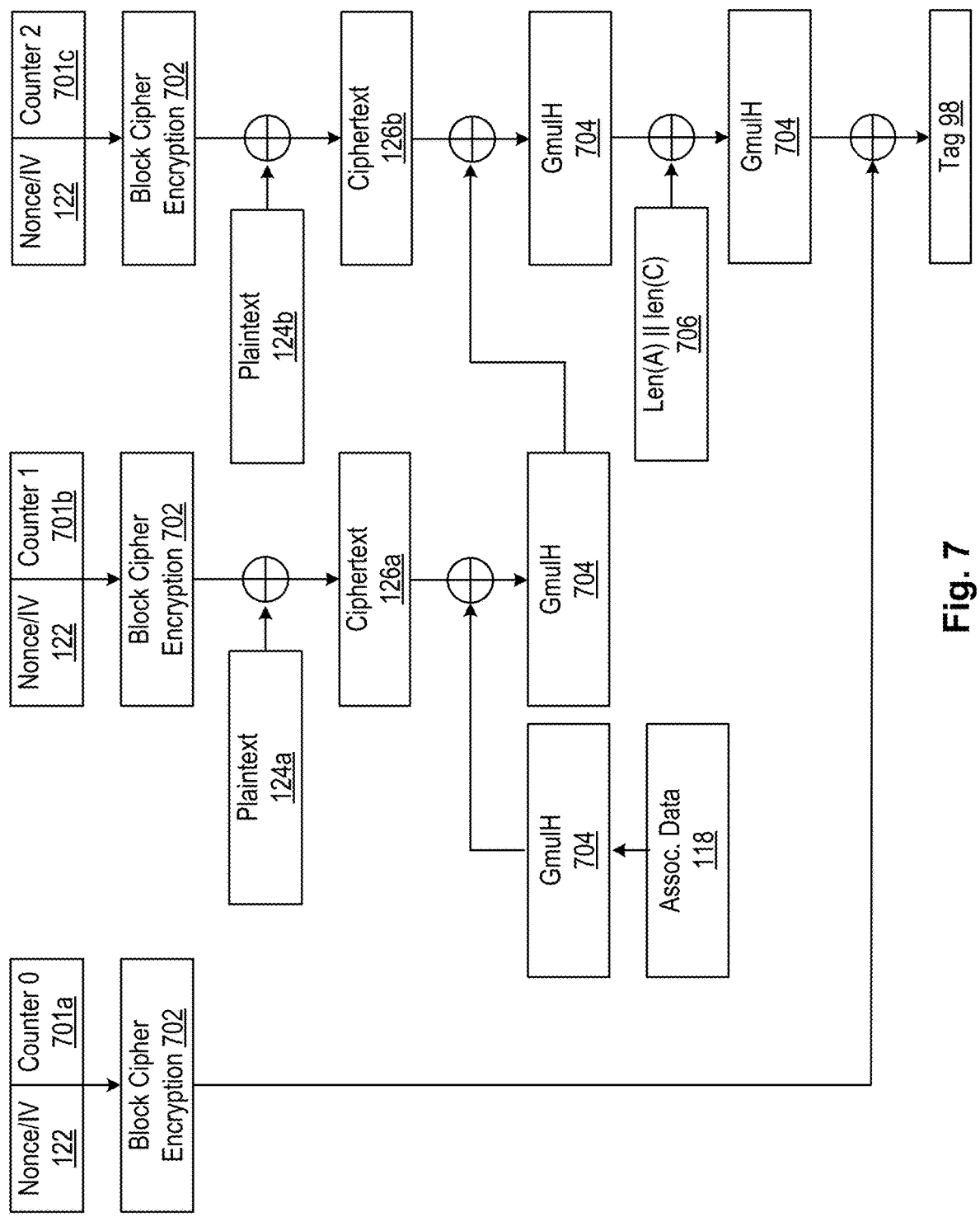
FIG. 7 is a dataflow diagram illustrating a block cipher counter mode of a security command decoder as described herein for a system like that of FIG. 1.
Figure 8A:
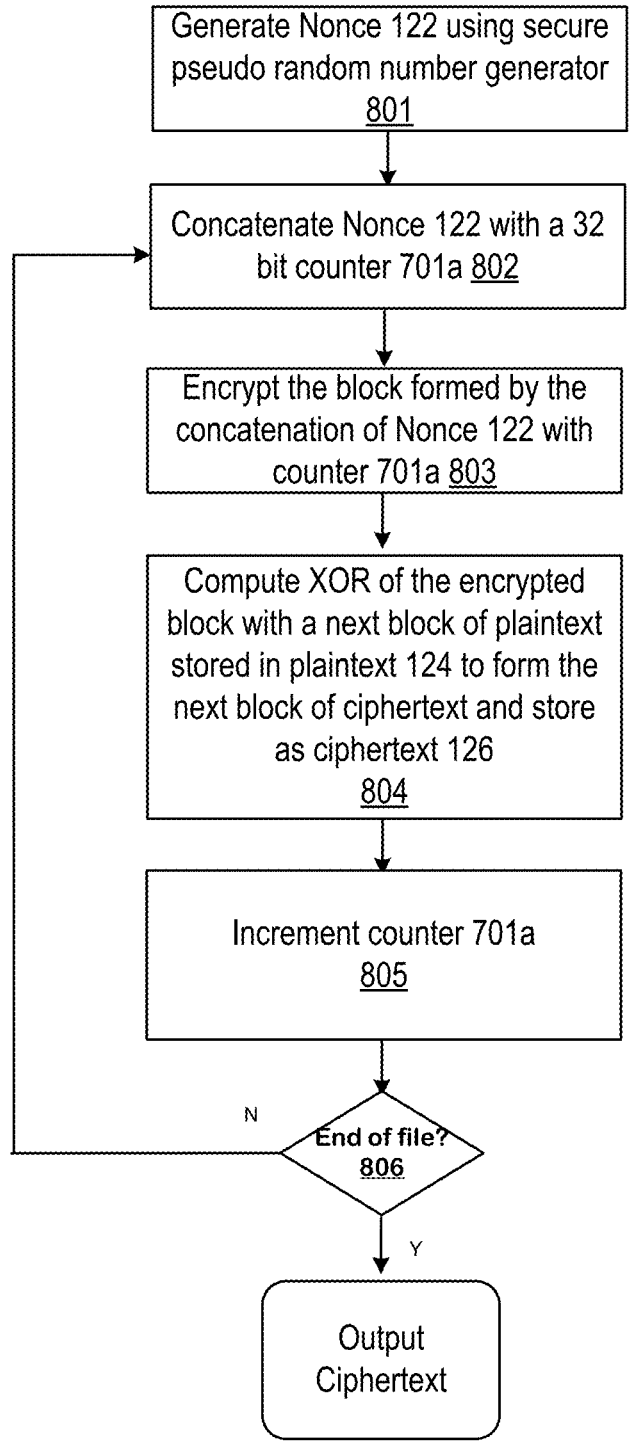
FIG. 8A is a flowchart illustrating a block cipher counter mode operation for a security command decoder as described herein for a system like that of FIG. 1.

Now with reference to FIG. 7 and FIG. 8A, FIG. 7 shows a dataflow diagram 700 illustrating a block cipher counter mode of a security command decoder as described herein for a system like that of FIG. 1. Security engine 112 includes encryption/decryption circuitry that implements one or more encryption algorithms that can be realized using an IP core, programmable logic and processor, circuitry or combinations thereof. Some examples of encryption algorithms include without limitation, Authenticated Encryption Standard (AES) in Galois/Counter Mode (GCM) mode (i.e., AES-GCM), Authenticated Encryption Standard with Counter in Cipher Block Chaining Message Authentication Code (CBC-MAC) mode (i.e., AES-CCM) or the like. For background information about AES-GCM and AES-CCM, reference may be had to NIST Special Publication 800-38A, entitled "Recommendation for Block Cipher Modes of Operation: Methods and Techniques" (//doi.org/10.6028/NIST.SP.800-38A). FIG. 8A is a flowchart illustrating a block cipher counter mode operation for a security command decoder as described herein for a system like that of FIG. 1.

In a block 801, an initialization vector (IV) (e.g., Nonce 122) is generated using a secure pseudo random number generator 121. In an implementation, the Nonce 122 is of size 96 bits (or 12 bytes) in length. The IV must be known only to the sender and the receiver.

In block 802, the Nonce 122 is then concatenated with a 32-bit counter 701a. In one implementation, counter 701a starts counting from zero. In another implementation, counter 701a starts counting from one. The counter starts from zero in implementations using counter mode for encrypting the plaintext. The concatenated string block is of size 128 bits and can now be encrypted.

In block 803, the block formed by the concatenation of Nonce 122 with counter 701a is encrypted with authenticated encryption standard using key 116. This results into a string s of size 16 bytes or 128 bits.

In block 804, the resultant string s is XORed with the first block of plaintext stored in plaintext buffer 124 to get the first block of ciphertext and stored in ciphertext buffer 126.

In block 805, the value of counter is then increased by one.

In block 806, steps 802 to 805 are repeated for each value of counter and different plaintext blocks in plaintext 124, forming ciphertext 126.

In one implementation, for the last block of plaintext, if the plaintext block is not a multiple of 16 (i.e., the blocksize), the resulting encrypted ciphertext string s will be sliced to a length equal to the length of last block of plaintext and then XORed with the last block of plaintext.

Having described how encryption/decryption security engine 112 can encrypt plaintext to form ciphertext, a process for generating a specific context for ensuring the integrity of the data with will be described with renewed reference to data flow diagram 700 of FIG. 7 and with reference to flowchart 800B of FIG. 8B.

One implementation of a process for generating a specific context including an Authentication Tag 98 is based upon an Encrypt-then-MAC construction and Wegman-Carter MAC. The function used for generating Authentication Tag is also known as GHASH( ) The function GHASH is defined by GHASH(H, A, C)=Xm+n+1, where the inputs A and C are associated data 118 and ciphertext 126, respectively, formatted as described above, and the variables Xi for i=0, . . . , m+n+1 are defined by equation (1):

$$X_i = \begin{cases} 0 & \text{for } i = 0 \\ (X_{i-1} \oplus A_i) \cdot H & \text{for } i = 1, \ldots, m-1 \\ (X_{m-1} \oplus (A_m^* \| 0^{128-v})) \cdot H & \text{for } i = m \\ (X_{i-1} \oplus C_i) \cdot H & \text{for } i = m+1, \ldots, m+n-1 \\ (X_{m+n-1} \oplus (C_m^* \| 0^{128-u})) \cdot H & \text{for } i = m+n \\ (X_{m+n} \oplus (\text{len}(A) \| \text{len}(C))) \cdot H & \text{for } i = m+n+1. \end{cases} \quad (1)$$

Figure 8B:
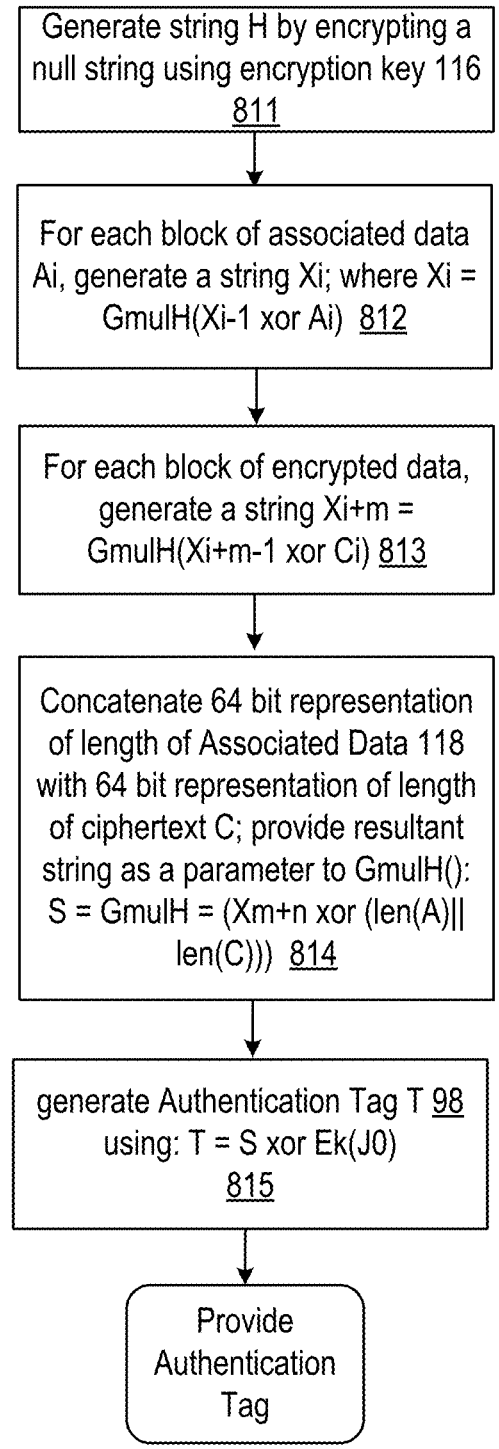
FIG. 8B is a flowchart illustrating a process for generating a specific context, e.g., an authentication tag, to verify the integrity of data using block cipher counter mode operation as described herein for a system like that of FIG. 1.

Now with reference to FIG. 7 and FIG. 8B; FIG. 7 is a dataflow diagram illustrating a block cipher counter mode of a security command decoder as described herein for a system like that of FIG. 1. FIG. 8B is a flowchart illustrating a process for generating a specific context, e.g., an authentication tag, to verify the integrity of data using block cipher counter mode operation as described herein for a system like that of FIG. 1.

In block 811, the secret string H is generated by encrypting a null string using encryption key 116, i.e., H=Ek ("\x00"*16); wherein "\x00"*16 is a null string of size 16 bytes.

In block 812, the Authentication Tag is generated in a series of steps, block wise. Hence, for each block of associated data 118, Ai, a string Xi is generated by circuit 704 using the following computation, and this contributes to the final authentication tag: Xi=GmulH(Xi−1 xor Ai), for i=1, . . . , m, X0=0. Here m is the number of blocks to be authenticated only (Associated Data blocks).

In block 813, now that associated data blocks Ai have been included in the authentication tag, the current authentication tag will be processed by circuit 704 and n ciphertext blocks 126a, 126b will also be included in the authentication tag: Xi+m=GmulH(Xi+m−1 xor Ci), for i=1, . . . , n. Here n is the number of blocks of ciphertext.

In block 814, the 64-bit representation of length of Associated Data A is concatenated with 64 bit representation of length of ciphertext C. The resultant string is supplied as a parameter to GmulH( ) as follows: S=GmulH=(Xm+n xor (len(A)∥len(C)))

In block 814, generate Authentication Tag T 128 using: T=S xor Ek(J0); wherein J0 is formed by the concatenation of initiation vector (e.g., Nonce 122) and counter0 701a.

In one implementation, authentication tag 98 can be generated in parallel with generation of each block of ciphertext from the encryption function.

In block 815, the service returns concatenation of ciphertext C and corresponding authentication tag T as the final output.

Galois/Counter Mode (GCM)

Figure 9:
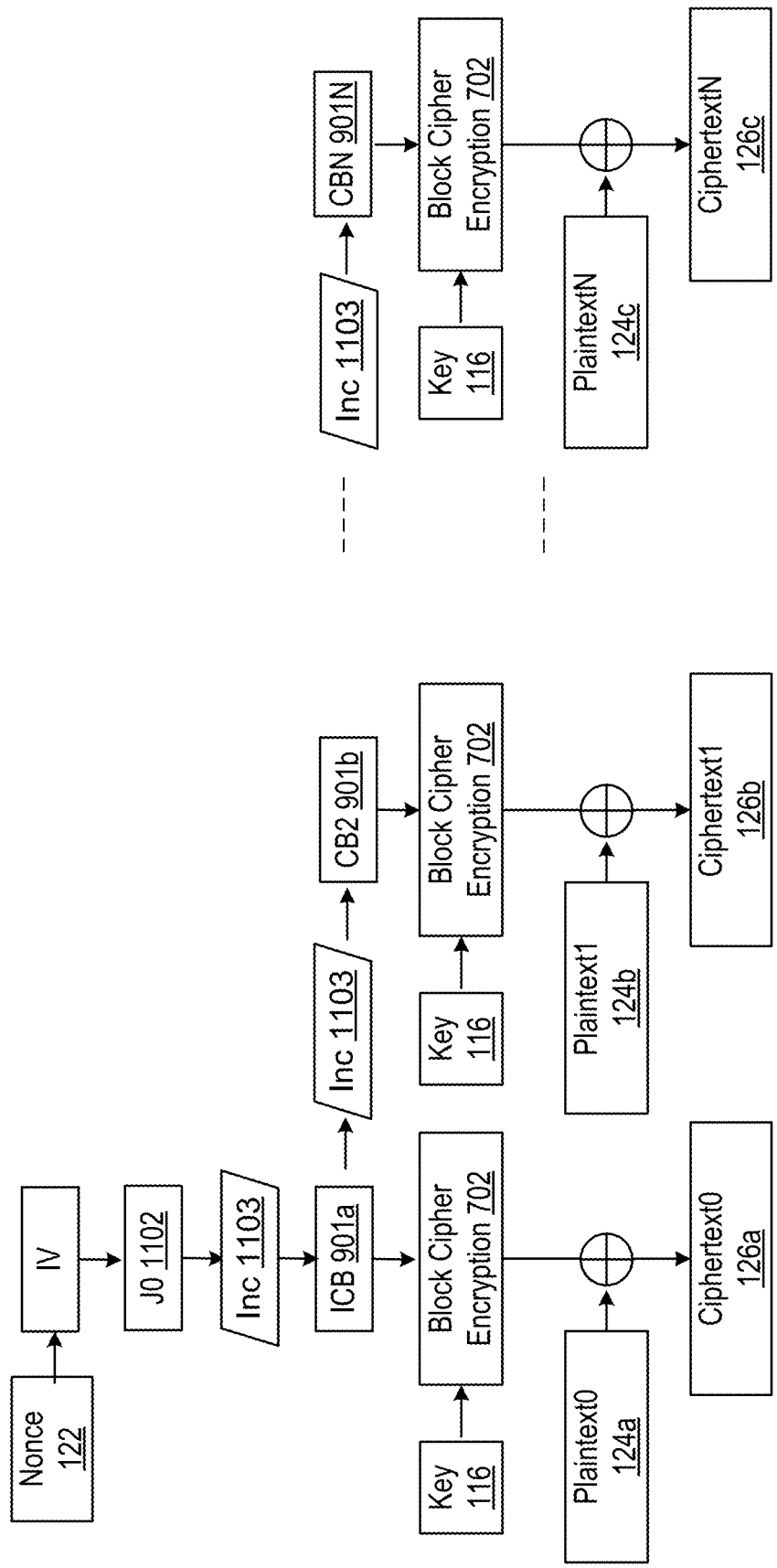
FIG. 9 is a dataflow diagram illustrating a block cipher counter mode of a security command decoder as described herein for a system like that of FIG. 1.
Figure 10:
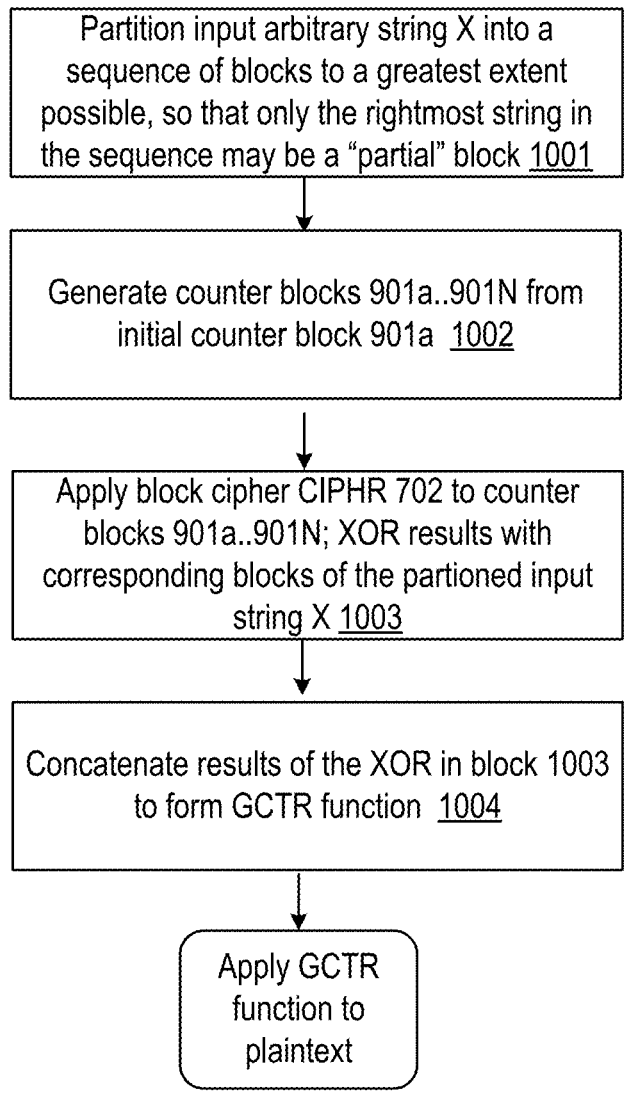
FIG. 10 is a flowchart illustrating a block cipher counter mode operation for a security command decoder as described herein for a system like that of FIG. 1.

Now with reference to FIG. 9 and FIG. 10, FIG. 9 shows a dataflow diagram 900 illustrating a block cipher counter mode of a security command decoder as described herein for a system like that of FIG. 1. Security engine 112 includes encryption/decryption circuitry that implements one or more encryption algorithms that can be realized using an IP core, programmable logic and processor, circuitry or combinations thereof. Some examples of encryption algorithms include without limitation GCTR Galois/Counter Mode. Further description of Galois/Counter Mode may be found in NIST Special Publication 800-38D, entitled "Recommendation for Block Cipher Modes of Operation: Galois/Counter Mode (GCM) and GMAC" (//nvlpubs.nist.gov/nistpubs/Legacy/SP/nistspecialpublication800-38d.pdf). Variables used in the GCM include:

| | |
|---|---|
| A | Additional authenticated data |
| C | Ciphertext |
| H | Hash subkey |
| IV | Initialization vector |
| K | Block cipher key |
| P | Plaintext |
| T | Authentication tag |
| t | Bit length of the authentication tag |
| $0^s$ | Bit string that consists of s '0' bits |
| CIPH | Approved block cipher with a 128-bit block size |
| $GCTR_K$ | Output of the GCTR function for a given block cipher with key K applied to a bit string |
| $GHASH_H$ | Output of the GHASH function under the hash subkey H applied to a bit string |
| $inc_s$ | Output of incrementing the right-most s bits of a bit string |
| len(X) | Bit length of a bit string X |
| $MSB_t$ | Bit string consisting of the t left-most bits of a bit string |

In one implementation the GCTR function is defined for an approved block cipher CIPH with a 128-bit block size, key K, inputs of initial counter block ICB 901, bit string X, of arbitrary length, and output of bit string Y of bit length len(x) as:

1. If X is the empty string, then return the empty string as Y.
2. Let n=⌈len(X)/128⌉.
3. Let $X_1, X_2, \ldots, X_{n-1}, X_n^*$ denote the unique sequence of bit strings such that
 $X=X_1\|X_2\| \ldots \|X_{n-1}\|X_n^*$;
 $X_1, X_2, \ldots, X_n-1$ are complete blocks.[2]
4. Let $CB_1$=ICB.
5. For i=2 to n, let $CB_i=inc_{32}(CB_{i-1})$.
6. For i=1 to n−1, let $Y_i=X_i \oplus CIPH_K(CB_i)$.
7. Let $Y_n^*=X_n^* \oplus MSB_{len(X_n^*)}(CIPH_K)(CB_n))$. (2)
8. Let $Y=Y_1\|Y_2\| \ldots \|Y_n^*$
9. Return Y.

FIG. 10 is a flowchart illustrating a block cipher counter mode operation for a security command decoder as described herein for a system like that of FIG. 1.

In block 1001, the input string of arbitrary length X is partitioned into a sequence of blocks to the greatest extent possible, so that only the rightmost string in the sequence may be a "partial" block.

In block 1002, the 32-bit incrementing function, inc, is iterated on the initial counter block 901 input to generate a sequence of counter blocks ICB 901a, CB2 901b, CBN 901N; the input block ICB 901a is the first block of the sequence.

In block 1003, the block cipher 702 is applied to the counter blocks 901a . . . 901N and the results are XORed with the corresponding blocks (or partial block) of the partition of the input string X.

In block 1004, the sequence of results is concatenated to form the output GCTR, which can be applied to plaintext 124a . . . 124c to produce ciphertext 126a . . . 126c.

Figure 11:
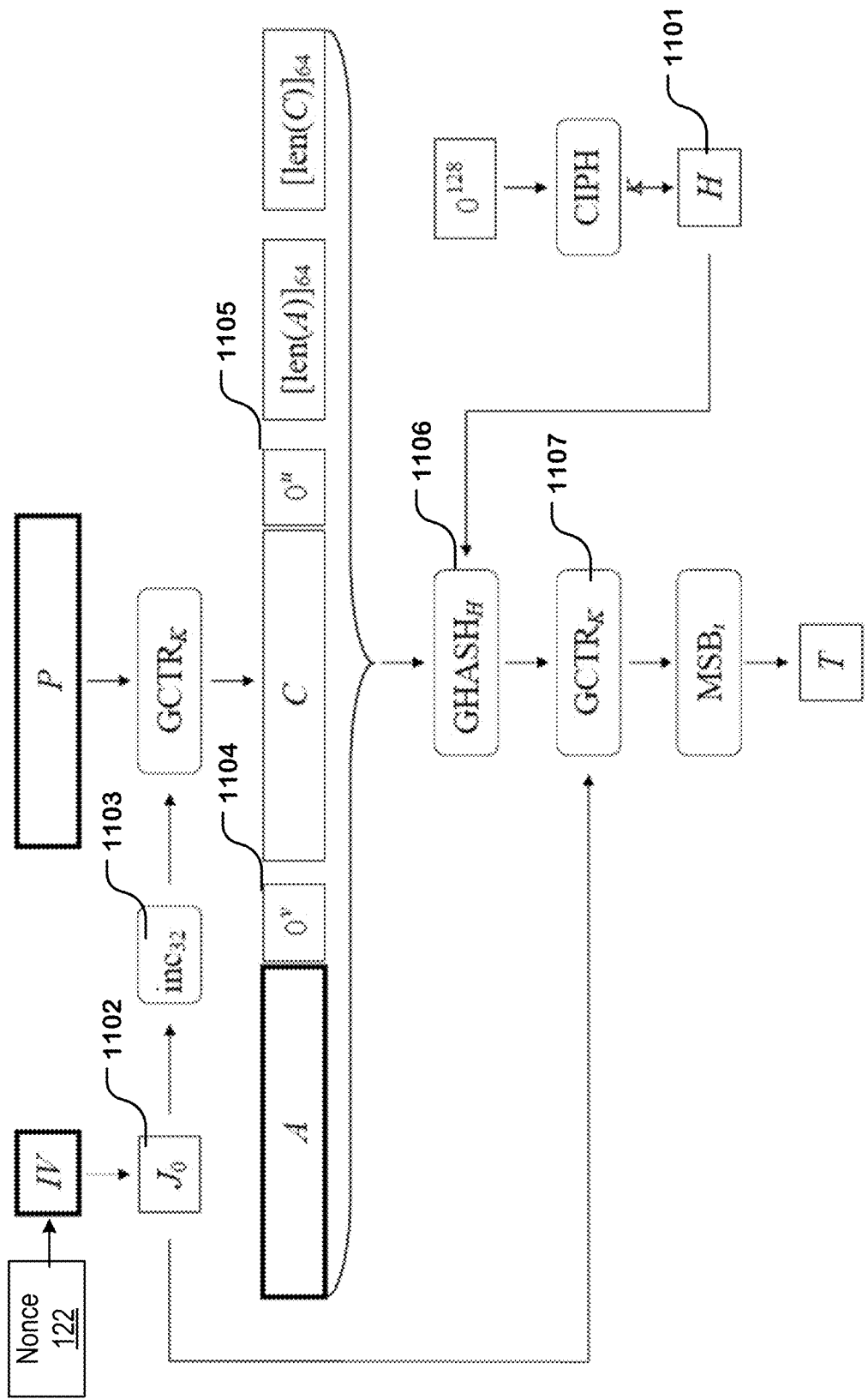
FIG. 11 is a dataflow diagram illustrating authenticated encryption function of GCM using a specific context for a security command decoder as described herein for a system like that of FIG. 1.
Figure 12:
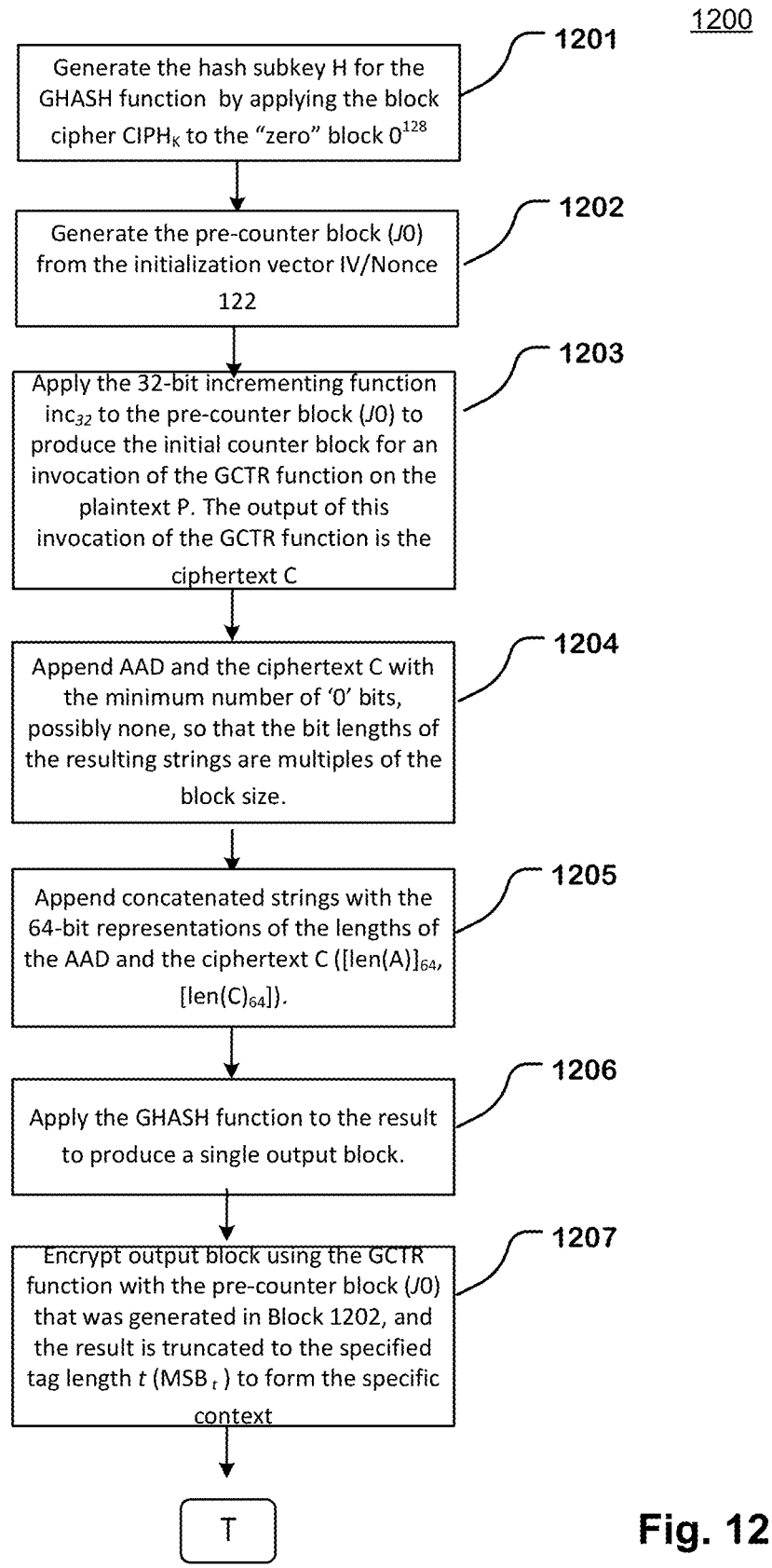
FIG. 12 is a flowchart illustrating a process for generating a specific context, e.g., an authentication tag, to verify the integrity of data using block cipher counter mode operation as described herein for a system like that of FIG. 1.

Now with reference to FIG. 11 and FIG. 12. FIG. 11 is a dataflow diagram illustrating authenticated encryption function of GCM using a specific context for a security command decoder as described herein for a system like that of FIG. 1. FIG. 12 is a flowchart illustrating a process for generating a specific context, e.g., an authentication tag, to verify the integrity of data using block cipher counter mode operation as described herein for a system like that of FIG. 1.

As shown in FIG. 11 and FIG. 12, the process of generating a specific context in an authenticated encryption function of GCM includes the steps:
1. Let $H=CIPH_K(0^{128})$.
2. Define a block. $J_0$, as follows;
 If len(IV)=96, then let $J_0=IV\|0^{31}\|1$.
 If len(IV)≠96, then let s=128 ⌈len(IV)/128⌉−len(IV), and let
 $J_0=GHASH_H(IV\|0^{s+64}\|[len(IV)]_{64})$,
3. Let $C=GCTR_K(inc_{32}(J_0), P)$.
4. Let u=128. ⌈len(C)/128⌉−len(C) and let v=128·⌈len(A)/128⌉−len(A)
5. Define a block. S, as follows:
 $S=GHASH_H(A\|0^v\|C\|0^u\|[len(A)]_{64}\|[len(C)]_{64})$,
6. Let $T=MSB_t(GCTR_K(J_0,S))$.

There are three input strings to the authenticated encryption function of GCM: a plaintext denoted P, additional authenticated data (AAD) denoted A, and an initialization vector IV (e.g., Nonce 122). GCM protects the authenticity of the plaintext and the AAD. There are two output strings from the authenticated encryption function of GCM: a ciphertext denoted C whose bit length is the same as that of the plaintext, and an authentication tag, or tag, denoted T. Mathematical components of GCM include an incrementing function $inc_s$ 1103 multiplication operation on blocks, a GHASH function and a GCTR function.

FIG. 12 is a flowchart illustrating a process for generating a specific context, e.g., an authentication tag, to verify the integrity of data using block cipher counter mode operation as described herein for a system like that of FIG. 1.

In Block 1201, the hash subkey H for the GHASH function is generated by applying the block cipher $\text{CIPH}_K$ to the "zero" block $0^{128}$.

In Block 1202, the pre-counter block (J0) 1102 is generated from the initialization vector IV (e.g., Nonce 122).

In Block 1203, the 32-bit incrementing function $\text{inc}_{32}$ is applied to the pre-counter block (J0) to produce the initial counter block for an invocation of the GCTR function on the plaintext P. The output of this invocation of the GCTR function is the ciphertext C.

In Blocks 1204 and 1205, the AAD and the ciphertext C are each appended with the minimum number of '0' bits, possibly none, so that the bit lengths of the resulting strings are multiples of the block size. The concatenation of these strings is appended with the 64-bit representations of the lengths of the AAD and the ciphertext C ($[\text{len}(A)]_{64}$, $[\text{len}(C)_{64}]$).

In Block 1206, the GHASH function is applied to the result to produce a single output block.

In Block 1207, this output block is encrypted using the GCTR function with the pre-counter block (J0) that was generated in Block 1002, and the result is truncated to the specified tag length t ($\text{MSB}_t$) to form the specific context (e.g., an authentication tag T).

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A byte is a basic storage unit used in many integrated circuit logic and memory circuits and consists of eight bits. Basic storage unit can have other sizes, including for example one bit, two bits, four bits, 16 bits and so on. Thus, the description of a security engine set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the disclosed technology, and it will be understood that numerous additional steps for accomplishing other functions can be performed before, after and between those shown.

A device having a command decoder, and a method responsive to a command sequence including a secure read command, are described herein.

A device having a command decoder, and a method to execute a secure read command are described herein, including determining, responsive to commands received at the input/output interface, that command information received from a host includes a secure memory read command, and to trigger performing, substantially contemporaneously: (i) outputting, along with the specific context, a first set of information read from memory array and encrypted by a security engine; (ii) using the security engine, performing encryption upon a second set of information read from the memory array; and (iii) reading a third set of information from the memory array into a buffer to be encrypted by the security engine; thereby providing a continuous output of encrypted information along with the specific context.

A device having a command decoder, and a method to execute a secure read command are described herein, including detecting in a received command sequence including: a command code field and a payload, that the command code field includes an op code indicating a continuous secure memory read in which information read from the memory array is encrypted by the security engine of the memory device prior to output; and detecting that the payload includes (i) an address pointing to at least one address of a plurality of addresses indicating a security region within the memory array from which information is to be read; and (ii) a configurable dummy cycle in which the specific context is to be output.

A device having a command decoder, and a method to execute a secure read command are described herein, including detecting in a received command sequence including: a command code field and a payload, that the command code field includes an op code indicating an operation to receive an input of the specific context; and detecting that the payload includes (i) a dummy cycle containing specific context information; wherein the specific context is stored in the memory device for use by the security engine in encrypting information read from the memory array.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit and the scope of the following claims.

What is claimed is:

1. A memory device, comprising:
a memory array including a plurality of bit lines;
an input/output interface for I/O data units;
data path circuits connected between the memory array and the input/output interface;
circuitry to maintain a specific context used in conjunction with encrypting information;
a security engine that includes circuitry to encrypt information retrieved from the memory array using the specific context and output the information as encrypted along with the specific context; and
a command decoder circuit, implementing logic to determine, responsive to commands received at the input/output interface, that a received command sequence received from a host includes a command code field and a payload, wherein the command code field includes an op code indicating a continuous secure memory read command, in which information read from the memory array is encrypted by the security engine of the memory device prior to output, and wherein the payload includes: an address pointing to at least one address of a plurality of addresses indicating a security region within the memory array from which information is to be read; and a configurable dummy cycle in which the specific context is to be output; and to trigger performing, substantially contemporaneously:
(i) outputting, along with the specific context, a first set of information read from the memory array and encrypted by the security engine;
(ii) performing encryption upon a second set of information read from the memory array through the security engine; and
(iii) reading a third set of information from the memory array into a buffer to be encrypted by the security engine; and
wherein activities (i)-(iii) are repeated until a specified end of a secure area of addresses in the memory array is reached; thereby providing a continuous output of encrypted information along with the specific context.

2. The memory device as recited by claim 1, wherein the configurable dummy cycle is configured using one or more of a Serial Flash Discoverable Parameter Structure (SFDP).

3. The memory device as recited by claim 1, wherein the configurable dummy cycle is configured using one or more of a Read only information array that configured by factory.

4. The memory device as recited by claim 1, wherein the configurable dummy cycle is configured using one or more of a configuration array that allows a user to define.

5. The memory device as recited by claim 1, wherein the specific context includes one or more of:
a nonce, a dummy cycle monotonic counter, a fixed value, a unique ID, and any combination thereof.

6. The memory device as recited by claim 5, wherein the dummy cycle monotonic counter is used to uniquely identify a communication session; thereby preventing a replay attack.

7. The memory device as recited by claim 1 the command decoder circuit further implementing logic to perform:
detecting in a received command sequence including: a command code field and a payload, that the command code field includes an op code indicating an operation to receive an input of the specific context; and
detecting that the payload includes (i) a dummy cycle containing specific context information; wherein the specific context is stored in the memory device for use by the security engine in encrypting information read from the memory array.

8. The memory device as recited by claim 1, wherein circuitry to maintain a specific context includes:
circuitry to generate a pseudo-random number.

9. The memory device as recited by claim 1, wherein circuitry to maintain a specific context includes:
circuitry to generate a unique identifier (ID).

10. The memory device as recited by claim 1, wherein circuitry to maintain a specific context includes:
circuitry to generate a physical unclonable function (PUF) code.

11. The memory device as recited by claim 1, wherein the input/output interface for I/O data units implements a Serial/Parallel Interface IO of at least one of 1IO, 2IO, 4IO, 8IO, 1I2O, 1I4O, and 1I8O.

12. A memory device as recited by claim 1, the security engine further including circuitry to perform:
Advanced Encryption Standard Counter (AES-CTR) block mode encryption of data read from the memory array prior to output.

13. A memory device as recited by claim 1, the security engine further including circuitry to perform:
Galois/Counter Mode (GCM) block mode encryption of data read from the memory array prior to output.

14. A method for performing a high performance secure read of information from a memory array of a memory chip, including:
detecting by the memory chip that a command received from a host includes a command code field and a payload, wherein the command code field includes an op code indicating a continuous secure memory read command, in which information read from the memory array is encrypted by a security engine prior to output, and wherein the payload includes: an address pointing to at least one address of a plurality of addresses indicating a security region within the memory array from which information is to be read; and a configurable dummy cycle in which a specific context is to be output; and triggering performing, substantially contemporaneously:
(i) outputting a first set of information read from the memory array and encrypted by an on-chip security engine, along with the specific context used to encrypt the first set of information;
(ii) performing encryption upon a second set of information read from the memory array through the on-chip security engine; and
(iii) reading a third set of information from the memory array into a buffer to be encrypted by the on-chip security engine; and
repeating activities (i)-(iii) until a specified end of a secure area of addresses in the memory array is reached; thereby providing a continuous output of encrypted information along with the specific context.

15. A method for performing a high performance secure read of information from a memory array of a memory chip, including:
detecting by the memory chip that a first command received from a host includes a secure memory read request command; and in response triggering performing of operations including:

inputting a specific context to be used to encrypt information to be read out from the memory array; and detecting by the memory chip that a second command received from a host includes a command code field and a payload, wherein the command code field includes an op code indicating a continuous secure memory read response command, in which information read from the memory array is encrypted by a security engine prior to output, and wherein the payload includes: an address pointing to at least one address of a plurality of addresses indicating a security region within the memory array from which information is to be read; and a configurable dummy cycle in which the specific context is to be output; and in response triggering performing of operations to output encrypted data continuously, including substantially contemporaneously:

(i) outputting a first set of information read from the memory array and encrypted by an on-chip security engine, using the specific context;

(ii) using the on-chip security engine to perform encryption upon a second set of information read from the memory array; and (iii) reading a third set of information from the memory array into a buffer to be encrypted by the on-chip security engine.

16. The method of claim 15, further including outputting a MAC along with the encrypted data being output continuously.

17. The method of claim 15, wherein activities (i)-(iii) are repeated until a specified end of a secure area of addresses in the memory array is reached; thereby providing a continuous output of encrypted information.

18. The method of claim 15, wherein the configurable dummy cycle is configured using one or more of a Serial Flash Discoverable Parameter Structure (SFDP).

19. The method of claim 15, wherein the configurable dummy cycle is configured using one or more of a Read only information array that configured by factory.

20. The method of claim 15, wherein the configurable dummy cycle is configured using one or more of a configuration array that allows a user to define.

* * * * *